United States Patent
Kusakabe et al.

(10) Patent No.: US 8,278,008 B2
(45) Date of Patent: Oct. 2, 2012

(54) SERPENTINE FUEL CELL SEPARATOR WITH PROTRUSIONS AND FUEL CELL INCLUDING THE SAME

(75) Inventors: Hiroki Kusakabe, Osaka (JP); Toshihiro Matsumoto, Osaka (JP); Norihiko Kawabata, Osaka (JP); Yoshiki Nagao, Osaka (JP); Shinsuke Takeguchi, Osaka (JP); Yasuo Takebe, Kyoto (JP); Masaki Nobuoka, Nara (JP)

(73) Assignee: Panasonic Corporation, Osaka (JP)

( * ) Notice: Subject to any disclaimer, the term of this patent is extended or adjusted under 35 U.S.C. 154(b) by 1026 days.

(21) Appl. No.: 11/997,950

(22) PCT Filed: Aug. 4, 2006

(86) PCT No.: PCT/JP2006/315524
§ 371 (c)(1),
(2), (4) Date: Feb. 5, 2008

(87) PCT Pub. No.: WO2007/018156
PCT Pub. Date: Feb. 15, 2007

(65) Prior Publication Data
US 2009/0162727 A1  Jun. 25, 2009

(30) Foreign Application Priority Data

Aug. 5, 2005 (JP) ................................. 2005-228782
Jan. 5, 2006 (JP) ................................. 2006-000883

(51) Int. Cl.
*H01M 8/04* (2006.01)
(52) U.S. Cl. ....................................................... 429/514
(58) Field of Classification Search ........... 429/400–535
See application file for complete search history.

(56) References Cited

U.S. PATENT DOCUMENTS

2004/0096725 A1* 5/2004 Mao et al. ........................ 429/38
(Continued)

FOREIGN PATENT DOCUMENTS

JP         02-155171       6/1990
(Continued)

OTHER PUBLICATIONS

Machine Translation of JP 2000-164230 originally published on Jun. 2000 to Sha et al.*

*Primary Examiner* — Basia Ridley
*Assistant Examiner* — Jonathan G Leong
(74) *Attorney, Agent, or Firm* — McDermott Will & Emery LLP

(57) ABSTRACT

A fuel cell separator and a fuel cell are provided that can improve uniformity in reaction gas flow rate and can prevent flooding due to excessive condensed water in passage grooves appropriately. A reaction gas passage region (101) of a separator (2) has a flow splitting region (21) having a passage groove group where the reaction gas is split, and one or more flow merge regions (22) having a recessed portion in which the reaction gas is mixed and connecting a plurality of flow splitting regions so that the passage groove group of the adjacent flow splitting regions (21) are connected to the recessed portion, and protrusions (27) vertically extend from a bottom face of the recessed portion and arranged in an island form. A pair of passage groove groups connected to the recessed portion of the flow merge region (22) is formed so as to have a greater number of grooves in the upstream passage groove group than the number of grooves of grooves in the downstream passage groove group. The recessed portion of the flow merge region (22) is defined, in a turn portion of a serpentine shaped reaction gas passage region (101), by oblique boundaries between the recessed portion and a pair of passage groove groups which are connected to the recessed portion and by the outer end of the turn portion.

5 Claims, 20 Drawing Sheets

U.S. PATENT DOCUMENTS

2005/0255367 A1 * 11/2005 Takahashi et al. ............. 429/38

FOREIGN PATENT DOCUMENTS

| JP | 08-185873 | 7/1996 |
| JP | 10-106594 | 4/1998 |
| JP | 11-250923 | 9/1999 |
| JP | 2000-164230 | 6/2000 |
| JP | 2000-294261 | 10/2000 |
| JP | 2005-190710 | 7/2005 |
| JP | 2005-190714 | 7/2005 |
| WO | WO 2005057707 A1 * | 6/2005 |

* cited by examiner

SERPENTINE FUEL CELL SEPARATOR WITH PROTRUSIONS AND FUEL CELL INCLUDING THE SAME

RELATED APPLICATIONS

This application is the U.S. National Phase under 35 U.S.C. §371 of International Application No. PCT/JP2006/315524, filed on Aug. 4, 2006, which in turn claims the benefit of Japanese Application No. 2005-228782, filed on Aug. 5, 2005, and Japanese Application No. 2006-000883, filed on Jan. 5, 2006, the disclosures of which Applications are incorporated by reference herein.

TECHNICAL FIELD

The present invention relates to fuel cell separators and fuel cells.

BACKGROUND ART

A polymer electrolyte fuel cell (hereafter also referred to as "PEFC" as needed) generates electric power and heat simultaneously by causing a fuel gas containing hydrogen and an oxidizing gas containing oxygen such as air to undergo an electrochemical reaction in the fuel cell.

The fuel cell has a membrane electrode assembly, referred to as "MEA." The MEA is sandwiched by a pair of conductive separators (specifically, a pair of separators comprising an anode separator and a cathode separator) so that gaskets are disposed on the peripheral edge portions of both sides of the MEA.

The PEFC generally has a structure in which MEA units are stacked between a pair of conductive separators to form a plurality of rows.

A serpentine-type fuel gas passage region through which a fuel gas (which is, of the reaction gas, a gas containing a reducing agent supplied to the anode) passes is formed on the surface of the anode separator so as to connect a fuel gas supply passage (a fuel gas supply manifold port) and a fuel gas discharge passage (a fuel gas exhaust manifold port). The fuel gas passage region is constituted by a plurality of fuel gas passage grooves formed so as to connect the fuel gas supply passage and the fuel gas discharge passage. The plurality of fuel gas passage grooves are bent in a serpentine shape so that they are laid parallel to one another, whereby the just-mentioned serpentine-type fuel gas passage region is formed.

A serpentine-type oxidizing gas passage region through which an oxidizing gas (which is, of the reaction gas, a gas containing an oxidizing agent supplied to the cathode) passes is formed on the surface of the cathode separator so as to connect an oxidizing gas supply passage (an oxidizing gas supply manifold port) and an oxidizing gas discharge passage (an oxidizing gas discharge manifold port). The oxidizing gas passage region is constituted by a plurality of oxidizing gas passage grooves formed so as to connect the oxidizing gas supply passage and the oxidizing gas discharge passage. The plurality of oxidizing gas passage grooves are bent in a serpentine shape so that they are laid parallel to one another, whereby the just-mentioned serpentine-type oxidizing gas passage region is formed.

With the above-described configuration, while the fuel gas is flowing through the passage grooves in the fuel gas passage region and while the oxidizing gas is flowing through the passage grooves in the oxidizing gas passage region, the reaction gas (power generation gas) is supplied to the MEA and is consumed by the electrochemical reaction inside the MEA.

Aiming at commercialization of PEFCs, the configurations of anode separator and cathode separator for realizing a better flow condition of the reaction gas to make a more stable electric power generation possible have been desired, and various attempts have been made to achieve the configurations (see Patent References 1 to 4).

For example, a separator provided with a reaction gas flow merge region at a turn portion of a plurality of passage grooves for merging the passage grooves has been proposed, which is intended to improve drainage performance of the condensed water generated in the passage grooves sufficiently, enhance gas dispersion performance of the reaction gas from the passage grooves to a gas dispersion electrode, reduce passage resistance (pressure loss), and so forth (see, for example, Patent References 2 and 4). In the flow merge region of the passage grooves, a plurality of protrusions in a dotted form are provided on the bottom face of a concave portion connected to the plurality of passage grooves.

In addition, a separator in which the number of passage grooves changes (reduces) as the passage grooves are closer from reaction gas supply passage (gas inlet side) to the reaction gas discharge passage (gas outlet side) has been proposed, which is aimed at improving the drainage performance of the above-mentioned condensed water, improving gas dispersion performance, and reducing the size effectively (see, for example, Patent References 1 and 3).

Patent Document 1: Japanese Unexamined Patent Publication No. 11-250923
Patent Document 2: Japanese Unexamined Patent Publication No. 10-106594
Patent Document 3: Japanese Unexamined Patent Publication No. 2000-294261
Patent Document 4: Japanese Unexamined Patent Publication No. 2000-164230

DISCLOSURE OF THE INVENTION

Problems the Invention is to Solve

Nevertheless, even the conventional separators that are represented by the separators described in Patent References 1 through 4 are far from an optimum design that sufficiently satisfies various performance capabilities required for the separators, such as reduction in variations of the reaction gas flow rate in the passage grooves, improvement in drainage performance of condensed water produced inside the passage grooves, improvement in the gas dispersion performance of the reaction gas from the passage grooves to the gas dispersion electrode, reduction in passage resistance (pressure loss) of the passage grooves, and promotion of reaction gas mixing. In particular, there has still been room for improvement in the design of the reaction gas flow merge region in which a plurality of passage grooves are merged.

For example, in a turn portion (grid-shaped groove: flow merge region) described in Patent Reference 2, grid-shaped grooves are formed over the entire width of a plurality of passage grooves (i.e., across the passage grooves at both side ends) for the purpose of improving the promotion of gas mixing of the reaction gas. However, since these grid-shaped grooves are provided so as to form linear boundaries that are perpendicular to the plurality of passage grooves (i.e., to form a quadrilateral flow merge region), it is possible that the reaction gas may remain in the grid-shaped grooves. Accordingly, the reaction gas distribution performance for a plurality of passage grooves that are located downstream from the grid-shaped grooves degrades due to such a stagnant condition of the reaction gas, and as a consequence, non-uniformity in the reaction gas flow rate between the passage grooves therein may result.

In particular, when the fuel cell is operated at a low load (when the reaction gas flow rate is low), condensed water tends to concentrate in the vicinity of lower passages in the reaction gas moving direction. The problem of the above-mentioned reaction gas residence becomes more obvious, and the degradation in the fuel cell performance (flooding) due to excessive water, which inhibits gas dispersion, tends to occur.

In addition, although a substantially triangular flow merge region described in Patent Reference 4 is designed to improve the problem of stagnation of the reaction gas, the design is far from preventing the plugging (flooding) appropriately inside the passage grooves by water droplets caused by concentration of condensed water and produced water in the passage grooves, and there has still been room for improvement.

It should be noted that the foregoing term "flooding" herein refers to the phenomenon of plugging of the inside of the gas passage grooves by water droplets in a separator, not the phenomenon of plugging of the pores in the gas dispersion electrode (for example, inside the catalyst layer) that serve as the gas diffusion paths by water droplets (the flooding in the gas dispersion electrode).

The present invention has been accomplished in view of the foregoing circumstances, and it is an object of the present invention to provide a fuel cell separator and a fuel cell that can improve uniformity in the reaction gas flow rate sufficiently (i.e., reduce variations of the reaction gas flow rate sufficiently) and can prevent the flooding due to excessive condensed water in the passage grooves appropriately and sufficiently.

Means to Solve the Problems

In order to resolve the foregoing problems, the present invention provides a fuel cell separator:
  wherein the fuel cell separator is formed in a plate shape and is provided on at least one main surface thereof with a reaction gas passage region through which a reaction gas flows, the reaction gas passage region being formed in a serpentine shape having a plurality of linear portions and one or more turn portions provided between the plurality of linear portions;
  the reaction gas passage region comprises:
  a plurality of flow splitting regions being formed so as to include at least the linear portions of the plurality of linear portions and the one or more turn portions, and having a passage groove group for splitting the reaction gas; and
  one or more flow merge regions formed in at least one of the one or more turn portions, the one or more flow merge regions having a recessed portion serving as a space in which the reaction gas is mixed and a plurality of protrusions that vertically extend from a bottom face of the recessed portion and are arranged in an island form, being disposed between the passage groove group of an adjacent upstream flow splitting region and the passage groove group of an adjacent downstream flow splitting region of the plurality of flow splitting regions, and being configured to allow the reaction gas flowing therein from the passage groove group of the upstream flow splitting region to merge in the recessed portion and to allow the reaction gas that has been merged to split again and flow into the downstream flow splitting region; and
  in the upstream flow splitting region and the downstream flow splitting region that are connected to the recessed portion of the flow merge region, the number of grooves of the passage groove group of the upstream flow splitting region is greater than the number of grooves of the passage groove group of the downstream flow splitting region; and
  the recessed portion of the flow merge region is, in the turn portion of the reaction gas passage region in which the recessed portion is formed, defined by an outer end of the turn portion and oblique boundaries between the recessed portion and a pair of the upstream passage groove group and the downstream passage groove group which are connected to the recessed portion.

Such plurality of protrusions arranged in the recessed portion in an island form disturbs the flow of the reaction gas flowing from the passage grooves of the flow splitting region into the flow merge region, making it possible to promote mixing of the reaction gas between the passage grooves.

Moreover, the number of passage grooves in the flow splitting region that is adjacent thereto and is located upstream from the flow merge region is made greater than the number of passage grooves located downstream therefrom. Therefore, variations in the reaction gas flow rate flowing through the passage grooves can be reduced sufficiently, taking the amount of reaction gas consumed when the reaction gas flows through the passage grooves, and the reaction gas flow rate can be controlled to a more uniform condition than by the conventional separators.

Furthermore, the boundaries between the flow merge region of the reaction gas and the pair of upstream passage groove group and the downstream passage groove group connected to the recessed portion are defined obliquely with respect to the orientations of the passage groove groups. Therefore, the reaction gas flows uniformly through the flow merge region, and the reaction gas distribution performance to the passage grooves downstream therefrom does not degrade. Thus, uniformity in the reaction gas flow rate can be maintained.

From the viewpoint of obtaining the advantageous effects of the present invention more reliably, it is preferable that, in the fuel cell separator according to the present invention, when viewed from a direction substantially normal to the main surface, the boundary between the recessed portion of the flow merge region and the upstream flow splitting region and the downstream flow splitting region which are connected to the recessed portion forms a shape protruding, in an arc shape, from both ends of a base that is an outer peripheral edge of the flow merge region toward a vertex located in the vicinity of the boundary line between the upstream flow splitting region connected to the recessed portion and the downstream flow splitting region connected to the recessed portion.

By defining the recessed portion so as to be in a shape protruding in an arc shape, the reaction gas can be allowed to flow uniformly over substantially the entire area of the recessed portion (for example, the reaction gas can be sent out to the corners of the recessed portion appropriately). Thus, uniformity in the reaction gas flow rate can be improved further (i.e., variations in the reaction gas flow rate can be reduced more sufficiently) without degrading the reaction gas distribution performance to the passage grooves downstream from the recessed portion.

Here, it is preferable in the fuel cell separator of the present invention that, as one example of the above-described recessed portion, the foregoing shape protruding in an arc shape be substantially triangular, from the viewpoint of obtaining the advantageous effects of the present invention more appropriately.

By defining the recessed portion so as to be in substantially a triangular shape, the reaction gas can be allowed to flow uniformly over substantially the entire area of the recessed portion (for example, the reaction gas can be sent out to the corners of the recessed portion appropriately). Thus, uniformity in the reaction gas flow rate can be improved further (i.e., variations in the reaction gas flow rate can be reduced sufficiently further) without degrading the reaction gas distribution performance to the passage grooves downstream from the recessed portion.

As for the substantially triangular shape, each side of the triangle need not be strictly a linear line, as long as the advantageous effects of the present invention can be obtained. For example, it may be a curve protruding in an arc shape outward of the triangle, a curve bent in an arc shape inward of the triangle, or a step-like discontinuous line.

Here, it is more preferable in the fuel cell separator of the present invention that, as one example of the above-described recessed portion, the foregoing shape protruding in an arc shape be substantially semi-circular, from the viewpoint of obtaining the advantageous effects of the present invention more appropriately.

By defining the recessed portion so as to be in substantially a semi-circular shape as well, the reaction gas can be allowed to flow uniformly over substantially the entire area of the recessed portion (for example, the reaction gas can be sent out to the corners of the recessed portion appropriately). Thus, uniformity in the reaction gas flow rate can be improved further (i.e., variations in the reaction gas flow rate can be reduced sufficiently further) without degrading the reaction gas distribution performance to the passage grooves downstream from the recessed portion.

As for the substantially semi-circular shape, it need not be strictly a semi-circle, as long as the advantageous effects of the present invention can be obtained. For example, it may be a semi-ellipsoid shape, and the curved line of the semicircle (or the semi-ellipsoid) may be a step-like discontinuous line other than a curved line.

Further, from the viewpoint of improving the drainage characteristics for water droplets produced in the passage grooves sufficiently, it is preferable that in the fuel cell separator of the present invention, the flow splitting region be formed to include the linear portion and the turn portion, and that in the same flow splitting region, the number of the passage grooves in the linear portion be the same as the number of passage grooves in the turn portion connected to the linear portion (see FIGS. 2 and 6, which will be described later).

By forming such a flow splitting region including a linear portion and a turn portion, relatively long passage grooves can be formed. In other words, the passage length per each one passage groove contained in a flow splitting region disposed between two flow merge regions can be made long. With such a passage groove with a long passage length, even when water droplets are produced in the passage groove, the difference between the gas pressure applied on the upstream side of the water droplets and the gas pressure applied on the downstream side thereof becomes large, and therefore, good drainage characteristics can be obtained.

Preferably, the fuel cell separator of the present invention further comprises:

a gas inlet manifold configured to supply the reaction gas from outside to the reaction gas passage region; and a gas outlet manifold configured to discharge a gas discharged from the reaction gas passage region to outside; and wherein the linear portion of a flow splitting region disposed on the most upstream side of the plurality of flow splitting regions is connected to the gas inlet manifold.

When the above-described configuration is employed, the flow merge region of the present invention is disposed neither immediately after the gas inlet manifold nor immediately before the gas outlet manifold. In this case, it becomes easily possible to prevent a portion of the fuel gas from flowing into the gap formed between the outer peripheral edge of the MEA and the inner peripheral edge of the ring-shaped gasket disposed on the outer side of the MEA when assembling the fuel cell. Moreover, the structure for preventing a portion of the reaction gas from flowing into the above-described gap can be made simple.

More specifically, the above-described gap exists between the gas inlet manifold and the reaction gas passage region, and the passage for supplying the reaction gas from the gas inlet manifold to the reaction gas passage region crosses the above-described gap. In addition, the above-described gap also exists between the gas outlet manifold and the reaction gas passage region, and the passage for discharge the reaction gas from the reaction gas passage region to the gas outlet manifold crosses the above-described gap. For this reason, a structure for gas sealing so that the passage for supplying the reaction gas is not connected to the above-described gap is necessary. If there is no such structure for gas sealing, the reaction gas supplied from the gas inlet manifold will result in a large amount of wasteful gas (the gas that is not utilized in the MEA), which is not supplied to the reaction gas passage region but enters the above-described gap, travels through the gap, and flows into the gas outlet manifold.

Since the flow merge region should support the gas dispersion electrode in contact with the protrusions vertically extended from the recessed portion and the gasket (made of a synthetic resin) by the protrusions, there is a possibility that the contact surface of the gasket (made of a synthetic resin) may sink into the portion in which there is no protrusions, resulting in an increase in the passage resistance (pressure loss). Accordingly, as with the separators according to patent reference 2 and patent reference 4 descried previously, when the flow merge region (referred to as "inlet side passage groove portion" in patent references 2 and 4) is disposed immediately after the gas inlet manifold and the flow merge region (referred to as "outlet side passage groove portion" in patent references 2 and 4) is disposed immediately before the gas outlet manifold, the structure for gas sealing aiming at preventing the reaction gas from flowing into the above-described gap becomes more complicated, and the formation of the structure becomes difficult.

In contrast, when the flow merge region is not disposed immediately after the gas inlet manifold as described above, the structure for gas sealing aiming at preventing the reaction gas from entering the above-described gap can be made more simple, and the structure can be formed easily.

In this case, it is further preferable that the linear portion of the flow splitting region disposed on the most downstream side of the plurality of flow splitting regions is connected to the gas outlet manifold.

When the above-described configuration is employed, the flow merge region of the present invention is disposed neither immediately after the gas inlet manifold nor immediately before the gas outlet manifold. In this case, it becomes possible to prevent a portion of the fuel gas from flowing into the gap formed between the outer peripheral edge of the MEA and the inner peripheral edge of the ring-shaped gasket disposed on the outer side of the MEA when assembling the fuel cell more easily. Also, the structure for preventing a portion of the reaction gas from flowing into the above-described gap can be made more simple, and the structure can be formed easily.

It should be noted that when the flow merge region is not disposed immediately after the gas inlet manifold (when the turn portion is not disposed immediately after the gas inlet manifold either), one of the flow splitting regions that is disposed on the most downstream side of the plurality of the flow splitting regions may have a turn portion in which no flow merge region is formed, and the turn portion may be connected to the gas outlet manifold. In this case as well, the structure for preventing a portion of the reaction gas from flowing into the above-described gap can be made simple, and the structure can be formed easily.

Preferably, the fuel cell separator of the present invention may further comprise:

a gas inlet manifold configured to supply the reaction gas from outside to the reaction gas passage region; and a gas outlet manifold configured to discharge a gas discharged from the reaction gas passage region to outside; and wherein a flow splitting region disposed on the most upstream side of the plurality of flow splitting regions has a turn portion in which the flow merge region is not formed, and the turn portion is connected to the gas inlet manifold.

In this case as well, the structure for preventing a portion of the reaction gas from flowing into the above-described gap can be made simple, and the structure can be formed easily.

Furthermore, when the flow merge region is not disposed immediately after the gas inlet manifold (when a turn portion having no flow merge region is disposed immediately after the gas inlet manifold), it is preferable that the linear portion of the flow splitting region disposed on the most downstream side of the plurality of the flow splitting regions be connected to the gas outlet manifold.

In this case as well, the structure for preventing a portion of the reaction gas from flowing into the above-described gap can be made simple, and the structure can be formed easily.

When the flow merge region is not disposed immediately after the gas inlet manifold (when a turn portion having no flow merge region is disposed immediately after the gas inlet manifold), one of the flow splitting regions that is disposed on the most downstream side of the plurality of the flow splitting regions may have the turn portion in which no flow merge region is formed, and the turn portion may be connected to the gas outlet manifold.

In this case as well, the structure for preventing a portion of the reaction gas from flowing into the above-described gap can be made simple, and the structure can be formed easily.

In the fuel cell separator of the present invention, it is preferable that when viewed from a direction substantially normal to the main surface, a convex-concave pattern comprising a plurality of concave portions having a uniform width, a uniform pitch, and a uniform level difference and a plurality of convex portions having a uniform width, a uniform pitch, and a uniform level difference in a direction crossing the passage groove group is formed on the surface of the separator corresponding to the above-described splitting region; the concave portions are the passage grooves of the passage groove group; and the convex portions are ribs for supporting an electrode portion in contact with the main surface.

In such a convex-concave pattern configuration, the electrode portion makes contact with the convex portions having a uniform pitch, a uniform width, and a uniform level difference, and as a result, the electrode portion in contact with the main surface can be supported uniformly over the surface.

Moreover, the separator having such a convex-concave pattern can be fabricated through metal molding (compression molding). Thereby, the separator can be constructed by a single plate, and as a result, productivity of the separator can be improved.

When such a configuration is adopted, the electrode portion (gas dispersion electrode) sinks uniformly into the passage grooves (concave portions) provided with a uniform pitch, a uniform width, and a uniform level difference. As a result, when the reaction gas is passed through the passage grooves, non-uniformity (variations) in the passage resistance (pressure loss) of the reaction gas between the passage grooves can be suppressed sufficiently.

Here, in the fuel cell separator of the present invention, it is preferable that, when viewed from a direction substantially normal to the main surface, the plurality of protrusions are disposed so that one or more of the protrusions form a plurality of columns lined up and spaced apart from each other with a gap along an extending direction of the outer end and one or more of the protrusions form a plurality of rows lined up and spaced apart from each other with a gap along a direction perpendicular to the extending direction of the outer end, and when a virtual line passing through the centers of protrusions constituting one of the rows and parallel to the extending direction is drawn, the centers of protrusions adjacent in the extending direction to the protrusions constituting the one of the rows deviate from the virtual line toward the perpendicular direction.

Moreover, in the fuel cell separator of the present invention, it is preferable that when viewed from a direction substantially normal to the main surface, the plurality of protrusions are disposed so that one or more of the protrusions form a plurality of columns lined up and spaced apart from each other with a gap along an extending direction of the outer end and one or more of the protrusions form a plurality of rows lined up and spaced apart from each other with a gap along a direction perpendicular to the extending direction of the outer end, and when a virtual line passing through the centers of protrusions constituting one of the columns and parallel to the perpendicular direction is drawn, the centers of protrusions adjacent in the perpendicular direction to the protrusions constituting the one of the columns deviate from the virtual line toward the extending direction.

By disposing such staggered protrusions, when the gas-liquid two-phase flow travels horizontally or vertically in the recessed portion, it is possible to hinder the gas-liquid two-phase flow from easily passing through the gaps between the protrusions and to cause the gas-liquid two-phase flow to hit the protrusions appropriately a plurality of times so that the flow can be disturbed. Thereby, it becomes possible to prevent the flooding due to the excessive condensed water in the fuel gas passage grooves downstream from the recessed portion reliably.

In particular, it is preferable that when the above-described staggered protrusions are disposed, each of the columns be configured by the protrusions constituting every other row.

In the separator in which a plurality of protrusions is disposed in the recessed portion in such a manner that the lines connecting the centers of the protrusions in the adjacent columns to each other or the lines connecting the centers of the protrusions in the adjacent rows to each other are bent in a V-shape a plurality of times, that is, in what is called a zigzag array condition, the condensed water is dispersed appropriately and allowed to flow into passage grooves downstream from the recessed portion. Thereby, it becomes possible to prevent the flooding due to the excessive condensed water in the passage grooves downstream from the recessed portion reliably.

In the fuel cell separator of the present invention, the shape of the protrusions may be any shape as long as the advantageous effects of the present invention can be exhibited. For example, the protrusions may have one shape selected from a substantially cylindrical shape, a substantially triangular prism shape, and a substantially quadrangular prism shape.

It should be noted that the substantially cylindrical shape in the present specification is meant to include a shape in which the cross section perpendicular to its elevation direction has a substantially right circular cylindrical shape as well as one in which the cross section deviates from the right circular shape (for example, an elliptic shape).

The substantially triangular prism shape in the present specification is a prism shape in which the cross section perpendicular to its elevation direction is shaped into a triangular shape formed of three points that are not in the same linear line and three line segments connecting the three points (such as a right triangle, an isosceles triangle, or an equilateral triangle), and it is also meant to include prism shapes in which the angles at the three corners are slightly round.

Furthermore, the substantially quadrangular prism shape in the present specification is a prism shape in which the cross section perpendicular to its elevation direction is shaped into a quadrilateral shape formed of four points that are not in the same linear line and four line segments connecting them (such as a rectangle, a square, a parallelogram, or a trapezoid), and it is also meant to include prism shapes in which the angles at the four corners are slightly round.

Also, in the present specification, the above-described array pattern of the protrusions in which "each of the columns comprises the protrusions constituting every other row" is referred to as a "zigzag array."

Here, as one typical example of the zigzag array in the recessed portion in the fuel cell separator of the present invention, it is preferable that when each of the protrusions is formed in a substantially cylindrical shape, the protrusions are disposed spaced apart with a gap equal to the diameter of the circular cross section of the protrusions in each of the rows, and the protrusions are disposed spaced apart from each other with a gap substantially three times as large as the diameter thereof in each of the columns. This is suitable because the protrusions are disposed regularly in a zigzag array condition over the surface of the recessed portion, which contributes to achieving uniform distribution of the condensed water among the passage grooves (lessening of non-uniform distribution) more effectively.

In the fuel cell separator of the present invention, it is preferable that the outer end curves in a position thereof so that outer end protruding portions protruding toward the recessed portion In the separator in which the outer end protruding portions are formed in the recessed portion, condensed water appropriately disperses and flows through the passage grooves downstream from the recessed portion. Thus, it becomes possible to prevent the flooding due to the excessive condensed water in the passage grooves downstream from the recessed portion more sufficiently.

In addition, in the fuel cell separator of the present invention, first protrusions and second protrusions having different width dimensions along the extending direction and/or the perpendicular direction may be disposed so as to form a plurality of rows lined up and spaced apart from each other with a gap along the direction perpendicular to the extending direction of the outer end.

By disposing the first protrusions and the second protrusions having different width dimensions along the extending direction or the perpendicular direction, the lines connecting the centers of the gap between the first protrusions and the second protrusions along the extending direction or the perpendicular direction are bent in a longitudinal direction of the gaps in which the gas-liquid two-phase flow passes. As a result, when the gas-liquid two-phase flows through the gaps in the recessed portion in the extending direction or the perpendicular direction, the flow of the gas-liquid two-phase flow is bent and disturbed so that it is prevented from easily passing through the gaps.

Therefore, mixing of the reaction gas is promoted by such a bent flow of the reaction gas. Moreover, the flooding due to the excessive condensed water in the fuel gas passage grooves on the downstream is suppressed because of the bent flow of the condensed water.

Furthermore, the reaction gas passage resistance within the recessed portion can be adjusted so that the reaction gas flow rate can become uniform by appropriately adjusting the numbers and arrangement locations of such bent portions for each of the columns and rows.

It should be noted that the shapes of the first protrusions and the second protrusions may be any shape as long as the advantageous effects of the present invention can be exhibited. For example, the protrusions may have one shape selected from a substantially cylindrical shape, a substantially triangular prism shape, and a substantially quadrangular prism shape as described above.

In the fuel cell separator of the present invention, it is preferable that when viewed from a direction substantially normal to the main surface, a convex-concave pattern comprising a plurality of concave portions having a uniform width, a uniform pitch, and a uniform level difference and a plurality of convex portions having a uniform width, a uniform pitch, and a uniform level difference in a direction crossing the passage groove group is formed on the surface of the separator corresponding to the above-described splitting region; the concave portions may be the passage grooves of the passage groove group; the convex portions are ribs for supporting an electrode portion in contact with the main surface; and the protrusions may be disposed on an extended line of the ribs.

In such a convex-concave pattern configuration, the electrode portion makes contact with the convex portions having a uniform pitch, a uniform width, and a uniform level difference, and as a result, the electrode portion in contact with the main surface can be supported uniformly over the surface. Moreover, the separator having such a convex-concave pattern can be fabricated through metal molding (compression molding). Thereby, the separator can be constructed by a single plate, and production cost of the separator can be suppressed.

In addition, the electrode portion (gas dispersion electrode) sinks uniformly into the passage grooves (concave portions) provided with a uniform pitch, a uniform width, and a uniform level difference. As a result, when the reaction gas is passed through the passage grooves, non-uniformity (variations) in the passage resistance (pressure loss) of the reaction gas between the passage grooves can be suppressed sufficiently.

In the fuel cell separator of the present invention, a first distance between the protrusions and the ribs, between the protrusions and the outer end protruding portions, and between the ribs and the outer end may be set smaller than a second distance between the protrusions. This configuration is preferable especially when each of the protrusions is formed in a substantially cylindrical shape.

By making the first distance narrower than the second distance, uniformization of the flow rate distribution of the reaction gas flowing in the recessed portion over the entire surface can be adjusted more appropriately by the passage resistance effected by such distances.

In summary, in the fuel cell separator of the present invention, it is preferable that the first distance and the second distance are set in such a manner that the product of the first distance and the flow rate of the reaction gas passing across the first distance when the first distance and the second distance are assumed to be constant substantially matches the product of the second distance and the flow rate of the reaction gas passing across the second distance when the first distance and the second distance are assumed to be constant, in order to obtain the advantageous effects of the present invention more appropriately.

It should be noted, from the viewpoint of obtaining the advantageous effects of the invention more appropriately, that in the fuel cell separator of the invention, it is possible to add the configuration of a characteristic element of the invention, "the plurality of protrusions is disposed so that one or more of the protrusions form a plurality of columns lined up and spaced apart from each other with a gap along an extending direction of the outer end and one or more of the protrusions form a plurality of rows lined up and spaced apart from each other with a gap along a direction perpendicular to the extending direction of the outer end, and each of the columns is constituted by the protrusions constituting every other the row" to an invention or an improvement thereto that is provided with an above characteristic element of the invention "the outer end curves so that outer end protruding portions protruding toward the recessed portion side are formed therein," so that an optimal design for prevention of the flooding due to condensed water in the passage grooves downstream from the recessed portion is achieved.

Furthermore, the present invention provides a fuel cell comprising:

an anode separator, a cathode separator, and a membrane electrode assembly disposed between the anode separator and the cathode separator; and one or more stack unit comprising the anode separator, the membrane electrode assembly, and the cathode separator, and wherein the fuel cell separator of the invention is incorporated as the anode separator or the cathode separator; and the reaction gas supplied to the anode separator is a reducing gas, and the reaction gas supplied to the cathode separator is an oxidizing gas.

With such a configuration, the reducing gas that flows through the flow splitting region in the anode separator diffuses in a good condition in the electrode portion from the anode separator over almost the entire area of the anode separator surface because the reducing gas consumption is taken into consideration and the flooding due to the excessive condensed water in the passage grooves is prevented. In addition, the oxidizing gas that flows through the flow splitting region in the cathode separator diffuses in a good condition in the electrode portion from the cathode separator over almost the entire area of the cathode separator surface because the oxidizing gas consumption is taken into consideration and the flooding due to the excessive condensed water in the passage grooves is prevented. As a result, the power generating operation by the fuel cell is performed nearly uniformly over almost the entire area of the electrode portion.

The foregoing and other objects, features and advantages of the present invention will become more readily apparent from the following detailed description of preferred embodiments of the invention, with reference to the accompanying drawings.

Effects of the Invention

As described above, the present invention makes available a fuel cell separator and a fuel cell that can improve uniformity in the reaction gas flow rate sufficiently (i.e., reduce variations of the reaction gas flow rate sufficiently) and can prevent the flooding due to excessive condensed water in the passage grooves appropriately and sufficiently.

BRIEF DESCRIPTION OF THE REFERENCE NUMERALS

Figure 1:
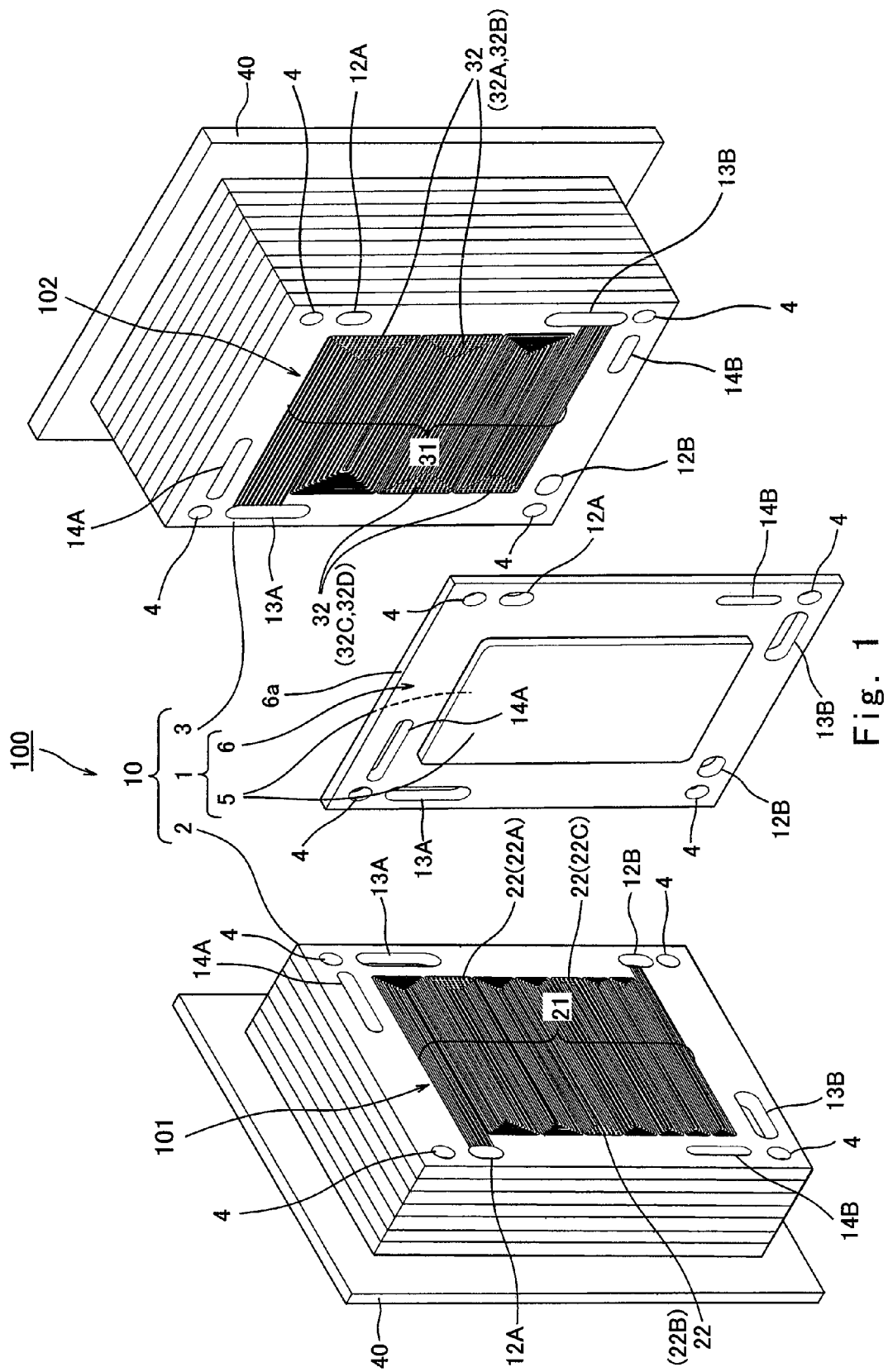
FIG. 1 is an exploded perspective view schematically illustrating the structure of a fuel cell according to one embodiment of the present invention.

1 MEA
2 anode separator
3 cathode separator
4 bolt hole
5 electrode portion
6 polymer electrolyte membrane
6a peripheral portion
10 fuel cell
12A, 12B fuel gas manifold port
13A, 13B oxidizing gas manifold port
14A, 14B water manifold port
21 fuel gas flow splitting region set
21A first fuel gas flow splitting region
21B second fuel gas flow splitting region
21C third fuel gas flow splitting region
21D fourth fuel gas flow splitting region
22 fuel gas flow merge region set
22A first fuel gas flow merge region
22B second fuel gas flow merge region
22C third fuel gas flow merge region
25 fuel gas passage groove (concave portion)
26, 36 convex portion
27, 37 protrusion
28, 38 recessed portion
28a, 38a base
28b, 28c, 38b, 38c hypotenuse
31 oxidizing gas flow splitting region set
31A first oxidizing gas flow splitting region
31B second oxidizing gas flow splitting region
31C third oxidizing gas flow splitting region
31D fourth oxidizing gas flow splitting region
31E fifth oxidizing gas flow splitting region
32 oxidizing gas flow merge region set
32A first oxidizing gas flow merge region
32B second oxidizing gas flow merge region
32C third oxidizing gas flow merge region
32D fourth oxidizing gas flow merge region
35 oxidizing gas passage groove (concave portion)
40 end plate
100 fuel cell stack
101 fuel gas passage region
102 oxidizing gas passage region
201, 202 region
601, 701 turn portion
602, 702 linear portion
P1, P2, P3, P4 pitch
D1, D2, D3, D4 level difference
W1, W2, W3, W4 width

BEST MODE FOR CARRYING OUT THE INVENTION

Hereinbelow, preferred embodiments of the present invention are described with reference to the drawings.

First Embodiment

FIG. 1 is an exploded perspective view schematically illustrating the structure of a fuel cell according to a first embodiment of the present invention.

As illustrated in FIG. 1, a fuel cell stack 100 is constituted by a plurality of rectangular fuel cells 10 stack on one another. End plates 40 are attached to the outermost layers on both ends of the fuel cell stack 100, and the fuel cells 10 are fastened by fastening bolts (not shown) that pierce through bolt holes 4 at the four corners of the fuel cells 10 from both the end plates 40 and nuts (not shown). Here, for example, 60 cells of the fuel cells 10 are stacked.

A MEA 1 of the fuel cell 10 comprises a pair of rectangular electrode portions 5 (a catalyst layer and a gas diffusion layer) provided at a central portion of both sides of a polymer electrolyte membrane 6. The fuel cell 10 has a pair of plate-shaped conductive separators 2, 3. A ring-shaped rectangular gasket (not shown) is provided on a peripheral portion 6a of the MEA 1. The gasket and the electrode portions 5 of the MEA 1 are sandwiched by the pair of conductive separators (specifically, an anode separator 2 and a cathode separator 3). Since the structure of the MEA 1 is well known, the detailed description thereof will be omitted here.

A fuel gas passage region 101 through which a fuel gas (reducing gas) passes is formed in a surface (obverse surface; a contact surface with one of the electrode portions 5) of the anode separator 2. This fuel gas passage region 101 comprises a fuel gas flow splitting region set 21 having a plurality of belt-shaped fuel gas passage grooves 25 (passage groove group: see, for example, FIG. 2), for distributing the fuel gas in a condition that is as uniform as possible and causing it to flow at a flow rate that is as uniform as possible, and a fuel gas flow merge region set 22 having a plurality of protrusions 27 (see, for example, FIG. 2) in an island form (in a substantially cylindrical form, more precisely, a substantially right circular cylindrical form herein) for merging a plurality of the fuel gas passage grooves 25 and promoting mixing of the fuel gas.

Figure 2:
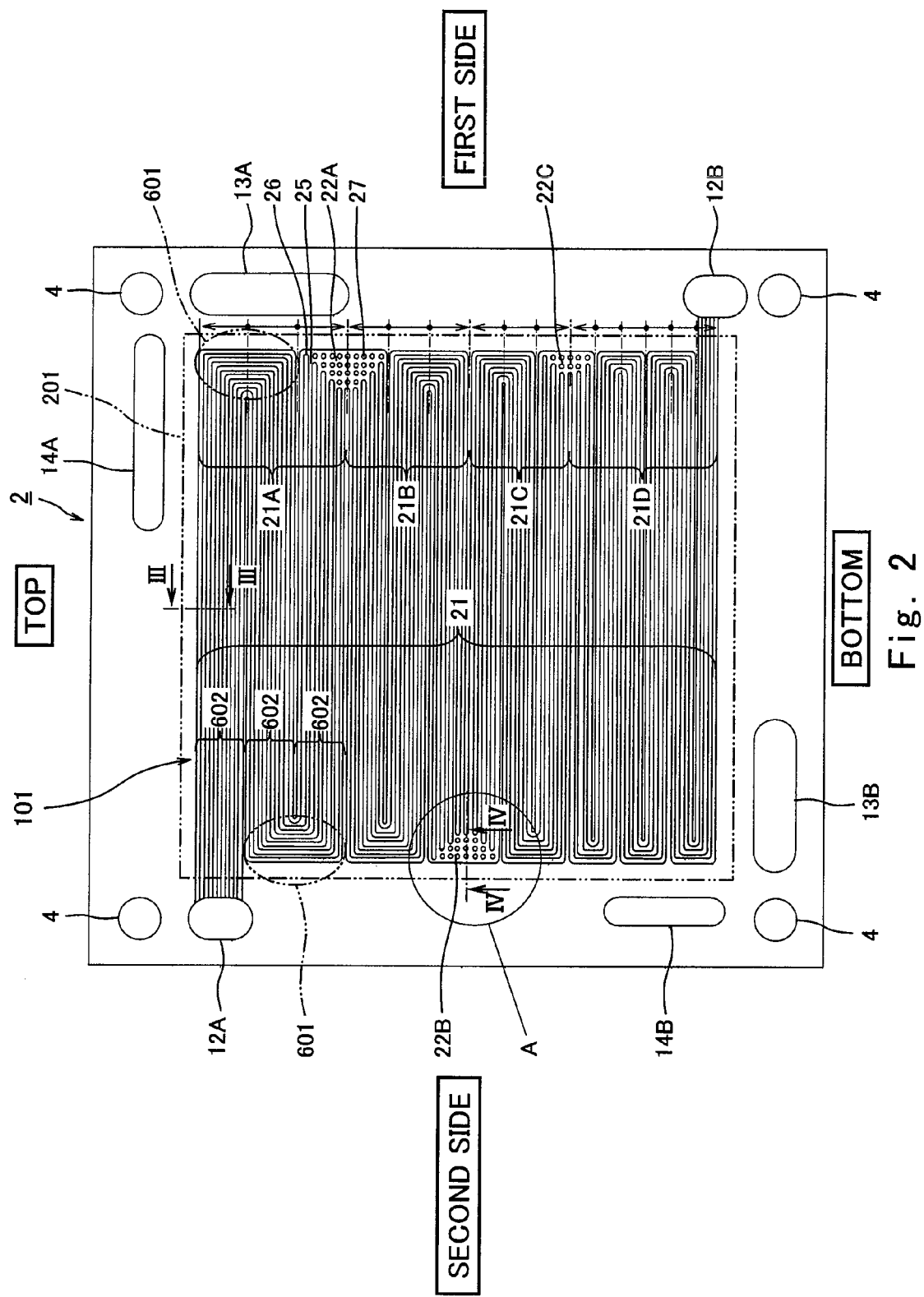
FIG. 2 is a view illustrating a surface of an anode separator.

It should be noted that although the protrusions 27 of the present embodiment are formed in a substantially cylindrical shape, as illustrated in FIG. 2, the shape of the protrusions 27 is not limited thereto, and the protrusions 27 may be formed in at least one shape selected from a substantially cylindrical shape, a substantially triangular prism shape, and a substantially quadrangular prism shape. It is also to be understood that even when the circular section perpendicular to the elevation direction of the protrusions 27 has an elliptic cylinder shape, as will be described in later-described modified example 2, other than the substantially right circular cylindrical shape of the present embodiment, such protrusions are regarded as having a substantially cylindrical shape in the present specification.

The configuration of the fuel gas passage region 101 will be described in detail later.

An oxidizing gas passage region 102 through which an oxidizing gas passes is formed in a surface (obverse surface; a contact surface with the other one of the electrode portions 5) of the cathode separator 3. This oxidizing gas passage region 102 comprises an oxidizing gas flow splitting region set 31 having a plurality of belt-shaped oxidizing gas passage grooves 35 (passage groove group: see, for example, FIG. 6), for distributing the oxidizing gas in a condition that is as uniform as possible and causing it to flow at a flow rate that is as uniform as possible, and an oxidizing gas flow merge region set 32 having a plurality of protrusions 37 (see, for example, FIG. 6) in an island form (in a substantially cylindrical form, more precisely, a substantially right circular cylindrical form herein) for merging a plurality of the oxidizing gas passage grooves 35 and promoting mixing of the oxidizing gas.

Figure 6:
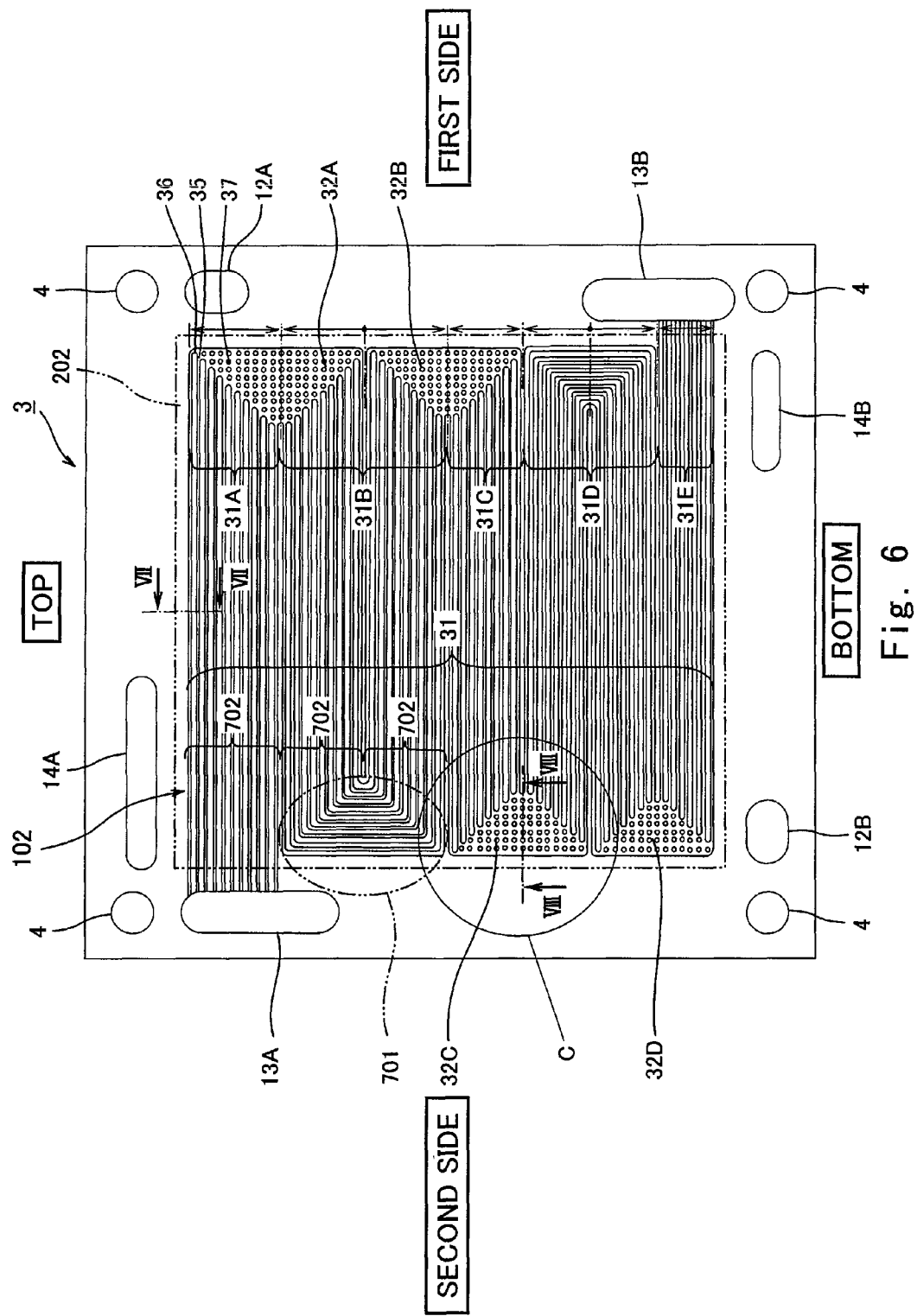
FIG. 6 is a view illustrating a surface of a cathode separator.

It should be noted that although the protrusions 37 of the present embodiment are formed in a substantially cylindrical shape like the foregoing protrusions 27, as illustrated in FIG. 6, the shape of the protrusions 37 is not limited thereto, and the protrusions 37 may be formed in at least one shape selected from a substantially cylindrical shape, a substantially triangular prism shape, and a substantially quadrangular prism shape.

The configuration of the oxidizing gas passage region 102 will be described in detail later.

A pair of fuel gas manifold ports 12A and 12B for supplying and discharging the fuel gas, a pair of oxidizing gas manifold ports 13A and 13B for supplying and discharging the oxidizing gas, and cooling water manifold ports 14A and 14B for supplying and discharging cooling water are provided in the separators 2 and 3 and the peripheral portion 6a of the MEA 1 so as to pierce therethrough.

In the form in which the fuel cells 10 are stacked, these ports 12A, 12B, 13A, 13B, 14A, 14B, and so forth are connected successively so that a pair of elliptic cylinder shaped fuel gas manifolds, a pair of elliptic cylinder shaped oxidizing gas manifolds, and a pair of elliptic cylinder shaped cooling water manifolds are formed extending in a stacking direction (screw-fastening direction) of the fuel cell stack 100.

Herein, the fuel gas passage region 101 is formed so as to extend in a serpentine shape and in a belt shape and to connect the fuel gas manifold port 12A and the fuel gas manifold port 12B. Thereby, a portion of the fuel gas flowing through the fuel gas manifold is guided from the fuel gas manifold port 12A of each of the anode separators 2 to the fuel gas passage region 101. The fuel gas guided in this way is consumed as a reaction gas in the MEA 1 while flowing through the fuel gas passage region 101. The fuel gas that has not been consumed here flows out from the fuel gas passage region 101 to the fuel gas manifold port 12B of each of the anode separators 2, and flows through the fuel gas manifold so that it is discharged outside the fuel cell stack 100.

On the other hand, the oxidizing gas passage region 102 is formed so as to extend in a serpentine shape and in a belt shape and to connect the oxidizing gas manifold port 13A and the oxidizing gas manifold port 13B. Thereby, a portion of the oxidizing gas flowing through the oxidizing gas manifold is guided from the oxidizing gas manifold port 13A of each of the cathode separators 3 to the oxidizing gas passage region 102. The oxidizing gas guided in this way is consumed as a reaction gas in the MEA 1 while flowing through the oxidizing gas passage region 102. The oxidizing gas that has not been consumed here flows out from the fuel gas passage region 102 to the oxidizing gas manifold port 13B of each of the cathode separators 3, and flows through the oxidizing gas manifold so that it is discharged outside the fuel cell stack 100.

Cooling water for keeping the temperature of the fuel cells 10 at an appropriate temperature flows in a plurality of cooling water grooves (not shown) provided in a reverse surface (the opposite surface to the foregoing obverse surface) of the cathode separator 3 through a pair of cooling water manifolds. The detailed description of the circulation structure of the cooling water will be omitted herein.

Next, the structure of the fuel gas passage region 101 provided in the anode separator 2 will be described in detail with reference to the drawings.

FIG. 2 is a view illustrating a surface of an anode separator.

Figure 3:
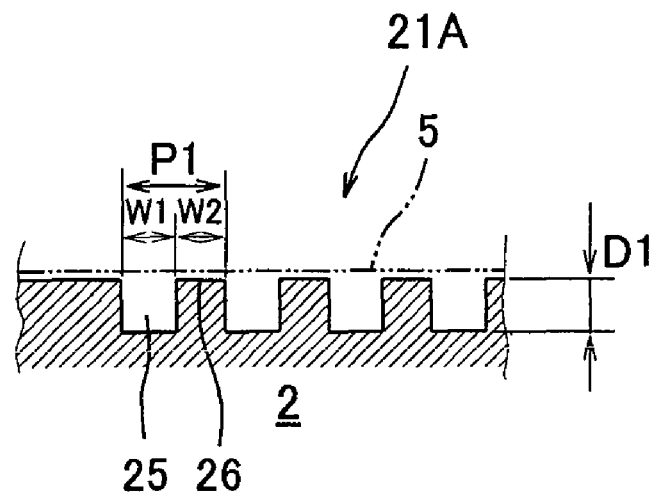
FIG. 3 is a cross-sectional view of the anode separator taken along line III-III in FIG. 2.
Figure 4:
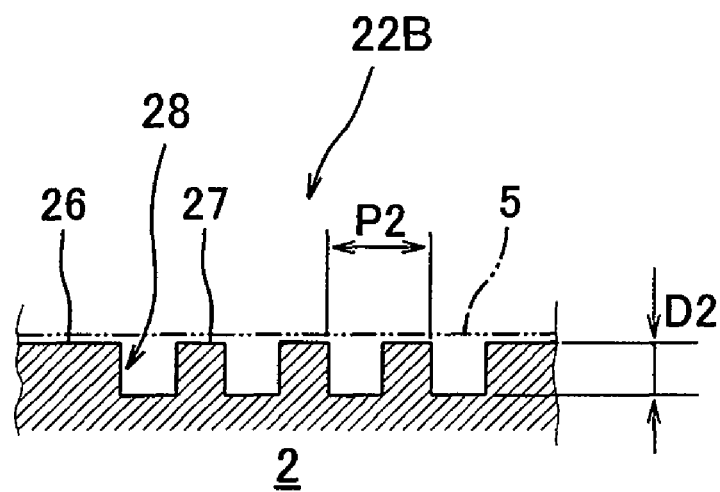
FIG. 4 is a cross-sectional view of the anode separator taken along line IV-IV in FIG. 2.

FIG. 3 is a cross-sectional view of the anode separator taken along line III-III in FIG. 2. FIG. 4 is a cross-sectional view of the anode separator taken along line IV-IV in FIG. 2.

Figure 5:
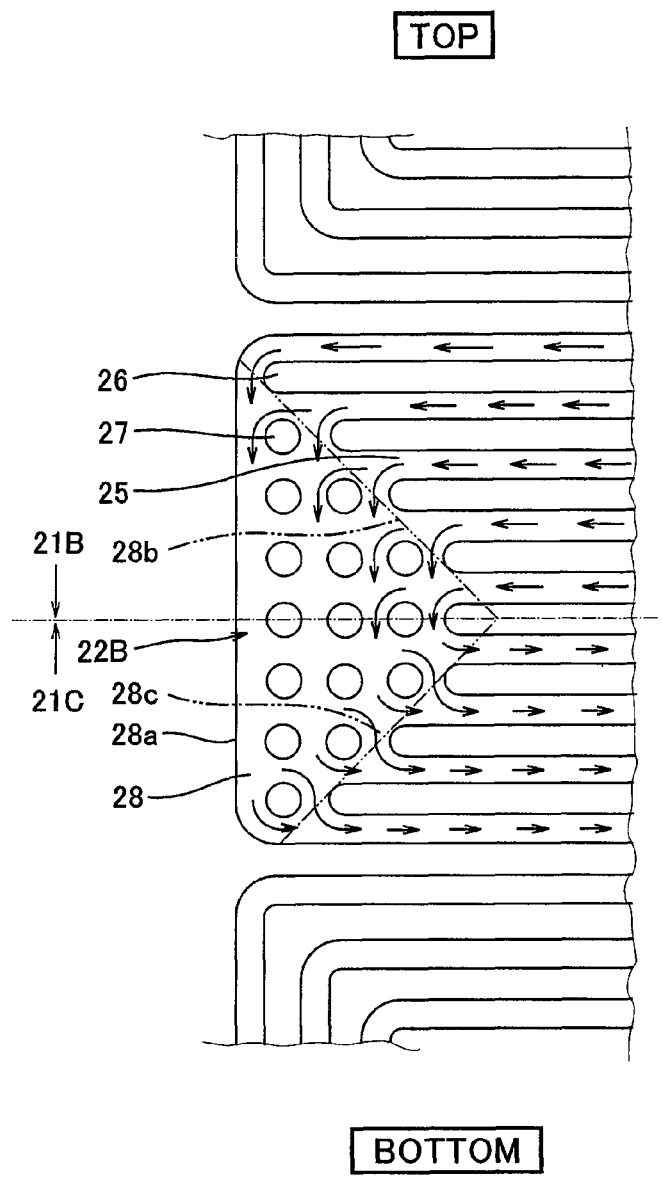
FIG. 5 is an enlarged view of a region C in FIG. 2.

FIG. 5 is an enlarged view of a region A in FIG. 2.

It should be noted that in FIGS. 2 and 5, the terms "top" and "bottom" refer to the upper direction and the lower direction, respectively, in an installation condition of the fuel cell stack 100 in which the anode separator 2 is incorporated, and in FIG. 2, the terms "first side" and "second side" refer to the right or left direction and the left or right direction, respectively, in an installation condition of the fuel cell stack 100 in which the anode separator 2 is incorporated.

As will be understood from FIG. 2, the fuel gas passage region 101 comprises the fuel gas flow splitting region set 21 and the fuel gas flow merge region set 22 (see FIG. 1), which are formed in a serpentine shape in a region 201 of the surface of the anode separator 2 that is in contact with the electrode portion 5 (gas dispersion electrode) of the MEA 1.

The fuel gas flow splitting region set 21 comprises first, second, third, and fourth fuel gas flow splitting regions 21A, 21B, 21C, and 21D, defined in that order from top to bottom, that have different numbers of the fuel gas passage grooves 25.

The fuel gas flow merge region set 22 include a first fuel gas flow merge region 22A interposed between the first fuel gas flow splitting region 21A and the second fuel gas flow splitting region 21B, a second fuel gas flow merge region 22B (intermediate flow merge region) interposed between the second fuel gas flow splitting region 21B and the third fuel gas flow splitting region 21C, and a third fuel gas flow merge region 22C interposed between the third fuel gas flow splitting region 21C and the fourth fuel gas flow splitting region 21D.

Here, as illustrated in FIG. 2, the first fuel gas flow splitting region 21A is formed by combining three linear portions 602 and two turn portions 601 of the serpentine-shaped fuel gas passage grooves 25. This first fuel gas flow splitting region 21A is formed so that the number of passage grooves in the linear portion 602 and the number of passage grooves in the turn portion connected to that linear portion 602 are the same.

Likewise, each of the second fuel gas flow splitting region 21B and the third fuel gas flow splitting region 21C is formed by combining three linear portions (not shown with reference numeral) and two turn portions (not shown with reference numeral). This second fuel gas flow splitting region 21B is also formed so that the number of passage grooves in the linear portion and the number of passage grooves in the turn portion connected to that linear portion are the same. This third fuel gas flow splitting region 21C is also formed so that the number of passage grooves in the linear portion and the number of passage grooves in the turn portion connected to that linear portion are the same.

Moreover, the fourth fuel gas flow splitting region 21D is formed by combining six linear portions (not shown with reference numeral) and five turn portions (not shown with reference numeral). This fourth fuel gas flow splitting region 21D is also formed so that the number of passage grooves in the linear portion and the number of passage grooves in the turn portion connected to that linear portion are the same.

The first fuel gas flow merge region 22A is formed in a turn portion interposed between the first fuel gas flow splitting region 21A and the second fuel gas flow splitting region 21B. The second fuel gas flow merge region 22B is formed in a turn portion interposed between the second fuel gas flow splitting region 21B and the third fuel gas flow splitting region 21C. Further, the third fuel gas flow merge region 22C is formed in a turn portion interposed between the third fuel gas flow splitting region 21C and the fourth fuel gas flow splitting region 21D.

By forming the flow splitting regions (the first, second, third and fourth fuel gas flow splitting regions 21A, 21B, 21C, and 21D) containing linear portions and turn portions in this way, relatively long passage grooves can be formed, as already discussed previously. In other words, the passage length per each one passage groove contained in a flow splitting region disposed between two flow merge regions can be made long. With such a passage groove with a long passage length, even when water droplets are produced in the passage groove, the difference between the gas pressure applied on the upstream side of the water droplets and the gas pressure applied on the downstream side thereof becomes large, and therefore, good drainage characteristics can be obtained.

As illustrated in FIG. 2, a linear portion 602 of the first fuel gas flow splitting region 21A, which is disposed on the most upstream side of the four flow splitting regions, is connected to the fuel gas manifold port 12A (gas inlet manifold), and a linear portion of the fourth flow splitting region 21D, which is disposed on the most downstream side of the four flow splitting regions, is connected to the fuel gas manifold port 12B (gas outlet manifold).

In other words, the present embodiment employs a configuration in which the flow merge region is disposed neither immediately after the fuel gas manifold port 12A (gas inlet manifold) nor immediately before the fuel gas manifold port 12B (gas outlet manifold). As already mentioned previously, by employing this configuration, it becomes easily possible to prevent a portion of the fuel gas from flowing into the gap (not shown) formed between the outer peripheral edge of the electrode portion 5 (gas dispersion electrode, anode) of the MEA 1 and the inner peripheral edge of the ring-shaped gasket disposed on the outer side of the MEA 1 when assembling the fuel cell stack 10. Thereby, the structure of the gas seal for preventing the fuel gas from flowing into the just-mentioned gap can be made simpler, and moreover, the structure can be easily formed.

It should be noted that when the flow merge region is not disposed immediately after the fuel gas manifold port 12A (gas inlet manifold) [when the turn portion is not disposed immediately after the fuel gas manifold port 12A (gas inlet manifold) either], it is possible that the fourth flow splitting region 21D, which is disposed on the most downstream side of the four flow splitting regions, may have a turn portion (not shown) in which no flow merge region is formed, and that turn portion may be connected to the fuel gas manifold port 12B (gas outlet manifold). In this case as well, the structure for preventing a portion of the reaction gas from flowing into the above-described gap can be made simple, and the structure can be formed easily.

The fuel gas flow splitting region set 21 is defined into the first, second, third, and fourth fuel gas flow splitting regions 21A, 21B, 21C, and 21D so that the first, second, and third fuel gas flow merge regions 22A, 22B, and 22C are interposed respectively therebetween, and so that the number of grooves of the fuel gas passage grooves 25 in the fuel gas flow splitting region set 21 that are located upstream from these flow merge regions 22A, 22B, and 22C is greater than the number of grooves of the fuel gas passage grooves 25 in the fuel gas flow splitting region set 21 that are located downstream therefrom.

Here, the locations of the first, second, and third fuel gas flow merge regions 22A, 22B, and 22C and the number of grooves of the fuel gas passage grooves 25 in the first, second, third, and fourth fuel gas flow splitting regions 21A, 21B, 21C, and 21D are determined so that the respective flow rates of the fuel gas flowing through the fuel gas passage grooves 25 in the first, second, third, and fourth fuel gas flow splitting regions 21A, 21B, 21C, and 21D are appropriate rates suitable for condensed water drainage and are also in agreement with each other, taking into consideration the amount of the fuel gas consumed for power generation that flows through the fuel gas passage grooves 25.

Such a configuration is suitable since it achieves a uniform supply of the fuel gas over the entire surface of the electrode portion 5 and ensures the drainage performance of the condensed water produced due to the fuel cell power generation that is effected by the fuel gas appropriately even in the downstream side (in the vicinity of the fuel gas manifold port 12B), in which the amount of the fuel gas is less and the condensed water tends to remain.

In this embodiment, as illustrated in FIG. 2, the second fuel gas flow splitting region 21B, which is on the downstream side of the first fuel gas flow merge region 22A, is configured so as to turn the first fuel gas flow splitting region 21A on the upstream side with the first fuel gas flow merge region 22A interposed therebetween, but is not configured so that the fuel gas flow merge region is provided for all the turn portions located on both side end portions thereof.

In other words, in the anode separator 2, there exist both a turn portion comprising a fuel gas flow merge region in which a plurality of protrusions 27 are formed in a recessed portion (described later) and a turn portion comprising a plurality of fuel gas passage grooves 25 bent in an angular C-shape, from the viewpoint of make the flow rate of the fuel gas flowing through the fuel gas passage grooves 25 uniform at a rate suitable for condensed water drainage.

More specifically, in the present embodiment, in the first fuel gas flow splitting region 21A, 6 rows of the fuel gas passage grooves 25 are configured so that they extend from the fuel gas manifold port 12A on the second side toward the first side, turning 180 degrees at two locations, and reach the first fuel gas flow merge region 22A.

In addition, in the second fuel gas flow splitting region 21B, 5 rows of the fuel gas passage grooves 25 are configured so that they extend from the downstream side of the first fuel gas flow merge region 22A located at a turn portion on the first side toward the second side, turning 180 degrees at two locations, and reach the second fuel gas flow merge region 22B.

In addition, in the third fuel gas flow splitting region 21C, 4 rows of the fuel gas passage grooves 25 are configured so that they extend from the downstream side of the second fuel gas flow merge region 22B located at a turn portion on the second side toward the first side, turning 180 degrees at two locations, and reach the third fuel gas flow merge region 22C.

In addition, in the fourth fuel gas flow splitting region 21D, 3 rows of the fuel gas passage grooves 25 are configured so that they extend from the downstream side of the third fuel gas flow merge region 22C located at a turn portion on the first side toward the second side, turning 180 degrees at five locations, and reach the fuel gas manifold port 12B.

As illustrated in FIG. 3, the transverse cross section of the first fuel gas flow splitting region 21A is formed in which a convex-concave pattern comprising a plurality of concave portions 25 (six concave portions herein) and a plurality of convex portions 26 (six convex portions herein) having a uniform pitch P1, a uniform width W1 and W2, and a uniform level difference D1. The concave portions 25 correspond to the fuel gas passage grooves 25 and the convex portions 26 correspond to ribs (support portions for the electrode portion 5) that make contact with and support the electrode portion 5.

With such a cross-sectional structure of the anode separator 2, the electrode portion 5 of the MEA 1 makes contact with the convex portions 26 of the first fuel gas flow splitting region 21A, whereby the electrode portion 5 is supported uniformly by top faces of the convex portions 26 provided so as to have a uniform pitch P1, a uniform width W2, and a uniform level difference D1. Moreover, the electrode portion 5 sinks uniformly inside the fuel gas passage grooves 25 provided so as to have a uniform pitch P1, a uniform width W1, and a uniform level difference D1.

This is suitable since such a configuration prevents the non-uniformity in the pressure loss of the fuel gas between a plurality of fuel gas passage grooves 25 sufficiently when passing the fuel gas through the fuel gas passage grooves 25 of the first fuel gas flow splitting region 21A. Moreover, it is suitable because the non-uniformity of the fuel gas diffusion over the surface (i.e., across the direction perpendicular to the thickness direction of the electrode portion 5) in the electrode portion 5 can be suppressed sufficiently.

The anode separator 2 having such a convex-concave pattern can be fabricated through metal molding (compression molding). Thereby, the anode separator 2 can be constructed by a single plate, and as a result, productivity of the anode separator 2 can be improved.

The configurations of the transverse cross sections of the second, third, and fourth fuel gas flow splitting regions 21B, 21C, and 21D are the same as the configuration described here, and are therefore not elaborated upon further.

As will be understood from FIGS. 4 and 5, the second fuel gas flow merge region 22B comprises a recessed portion 28 (concave-shaped region) that is connected to the fuel gas passage grooves 25 (concave portions 25) and a plurality of protrusions 27 in an island form (in a substantially cylindrical form herein) that vertically extend from the bottom face of the recessed portion 28.

It should be noted that as illustrated in FIG. 2, a recessed portion (not shown with reference numeral) similar to the just-mentioned recessed portion 28 and protrusions (not shown with reference numeral) similar to the just-mentioned protrusions 27 are formed also in the first fuel gas flow merge region 22A and the third fuel gas flow merge region 22C. The configurations of the first fuel gas flow merge region 22A and the third fuel gas flow merge region 22C are the same as that of the second fuel gas flow merge region 22B except for the number of passage grooves connected thereto, and are therefore not elaborated upon further.

The recessed portion 28 is formed on the surface of the anode separator 2 so as to be located in a turn portion on the second side of the serpentine-shaped fuel gas passage region 101. This recessed portion 28 is formed into a substantially right triangular shape having a base 28*a* extending vertically and a pair of hypotenuses 28*b* and 28*c* having 45-degree included angles with the base 28*a* when viewed from the surface of the anode separator 2. The base 28*a* constitutes the outer end (side edge) of the turn portion of the fuel gas passage region 101, the upper hypotenuse 28*b* constitutes the boundary with the second fuel gas flow splitting region 21B, and the lower hypotenuse 28*c* constitutes the boundary with the third fuel gas flow splitting region 21C. Each of the fuel gas passage grooves 25 of the second fuel gas flow splitting region 21B is connected to the recessed portion 28 at the upper hypotenuse 28*b*, while each of the fuel gas passage grooves 25 of the third fuel gas flow splitting region 21C is connected to the recessed portion 28 at the lower hypotenuse 28*c*. Herein, the recessed portion 28 is formed to have the same depth as that of the fuel gas passage grooves 25.

As illustrated in FIGS. 4 and 5, a plural number (15 herein) of the protrusions 27 are formed at a uniform pitch P2 on the extended lines of each of the convex portions 26 (except for the topmost one of the convex portions 26) of the second and third fuel gas sub-split passages 21B and 21C. The pitch P2 herein is the same as the pitch P1 of the convex portions 26 of each of the fuel gas flow splitting regions 21B and 21C. Moreover, as illustrated in FIG. 4, all the protrusions 27 have a uniform height (level difference) D2 and the same shape.

It should be noted that the protrusions 27 are disposed and arranged in an orthogonal grid shape so that their centers are in agreement with an extending direction (vertical direction) of the base 28*a* of the recessed portion 28 and with the direction (horizontal direction along the extended lines of the convex portions 26) perpendicular to this extending direction.

The protrusions 27 function as the gas flow disturbing pieces for promoting mixing of the fuel gas and also function as the support portions (ribs) for the electrode portion 5 of the MEA 1.

The configurations of the first and third fuel gas flow merge regions 22A and 22C are the same as the configuration described here (more accurately, the shapes of the recessed portions 28 are geometrically similar), and therefore the descriptions of the configurations thereof will be omitted.

Such an anode separator 2 (particularly the configuration of the fuel gas flow merge regions) makes it possible to obtain the following advantageous effects regarding the fuel gas mixing, fuel gas flow rate uniformity, and fuel gas pressure uniformization between a plurality of fuel gas passage grooves 25.

First, since the first, second, and third fuel gas flow merge regions 22A, 22B, and 22C are formed so as to have oblique linear boundaries with the fuel gas flow splitting regions, the fuel gas flows in a good condition through the second fuel gas flow merge region 22B almost uniformly, as indicated by the arrows in FIG. 5, for example. Therefore, the fuel gas distribution performance for the downstream fuel gas passage grooves 25 (the fuel gas passage grooves 25 of the third fuel gas flow splitting region 21C) does not degrade, making it possible to keep the uniformity of fuel gas flow rate in a good condition (in a condition in which variations of the gas flow rate are reduced further sufficiently).

Second, since the first, second, and third fuel gas flow merge regions 22A, 22B, and 22C are defined in a shape protruding in an arc shape as described above, more specifically, in a substantially triangular shape, the fuel gas can be allowed to flow substantially over the entire area of the recessed portion so that it can be sent out to the corners of the recessed portion 28 appropriately. Therefore, the fuel gas distribution performance to the fuel gas passage grooves 25 downstream from the recessed portion 28 does not degrade, and the uniformity in the fuel gas flow rate can be improved (i.e., variations in the gas flow rate can be reduced further sufficiently). Moreover, the passage lengths of the 5 rows of the fuel gas passage grooves 25 in the second fuel gas flow splitting region 21B connecting the first fuel gas flow merge region 22A and the second fuel gas flow merge region 22B are set to be equal to each other, and thereby, the flow rate uniformization of the fuel gas flowing through these fuel gas passage grooves 25 is not inhibited.

Likewise, the passage lengths of the 4 rows of the fuel gas passage grooves 25 in the third fuel gas flow splitting region 21C connecting the second fuel gas flow merge region 22B and the third fuel gas flow merge region 22C are set to be equal to each other, and thereby, the flow rate uniformization of the fuel gas flowing through these fuel gas passage grooves 25 is not inhibited.

Third, the flow of the fuel gas flowing from the fuel gas passage grooves 25 of the fuel gas flow splitting region set 21 into the fuel gas flow merge region set 22 is disturbed by the plurality of protrusions 27 arranged in an island form in the recessed portion 28, whereby the mixing of the fuel gas between the fuel gas passage grooves 25 can be promoted.

Fourth, all the fuel gas passage grooves 25 of the fuel gas flow splitting region set 22 are gathered in the fuel gas flow merge region set 22, in which pressure uniformization of the fuel gas can be achieved.

Fifth, it becomes possible to finely adjust the numbers of grooves of the fuel gas passage grooves 25 necessary for the respective fuel gas flow splitting regions 21A, 21B, 21C, and 21D by the fuel gas flow merge regions 22A, 22B, and 22C, which function as the relay parts that can change the number of grooves as desired. As a result, fine tuning of the fuel gas flow rate can be performed in which the amount of fuel gas consumed while the fuel gas is flowing through the fuel gas passage grooves 25 is taken into consideration.

Next, the structure of the oxidizing gas passage region 102 provided in the cathode separator 3 will be described in detail with reference to the drawings.

Figure 7:
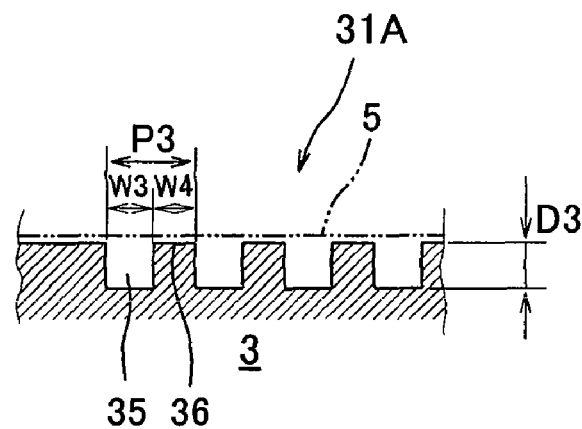
FIG. 7 is a cross-sectional view of the cathode separator taken along line VII-VII in FIG. 6.
Figure 8:
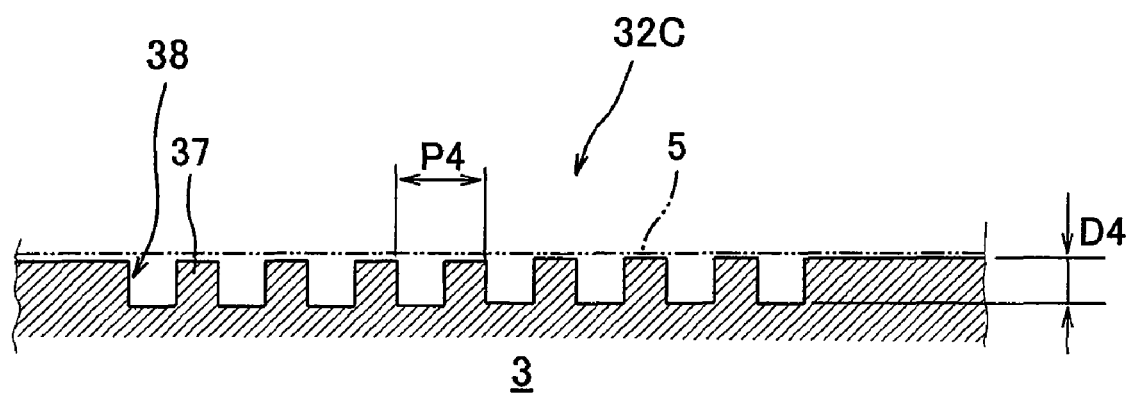
FIG. 8 is a cross-sectional view of the cathode separator taken along line VIII-VIII in FIG. 6.
Figure 9:
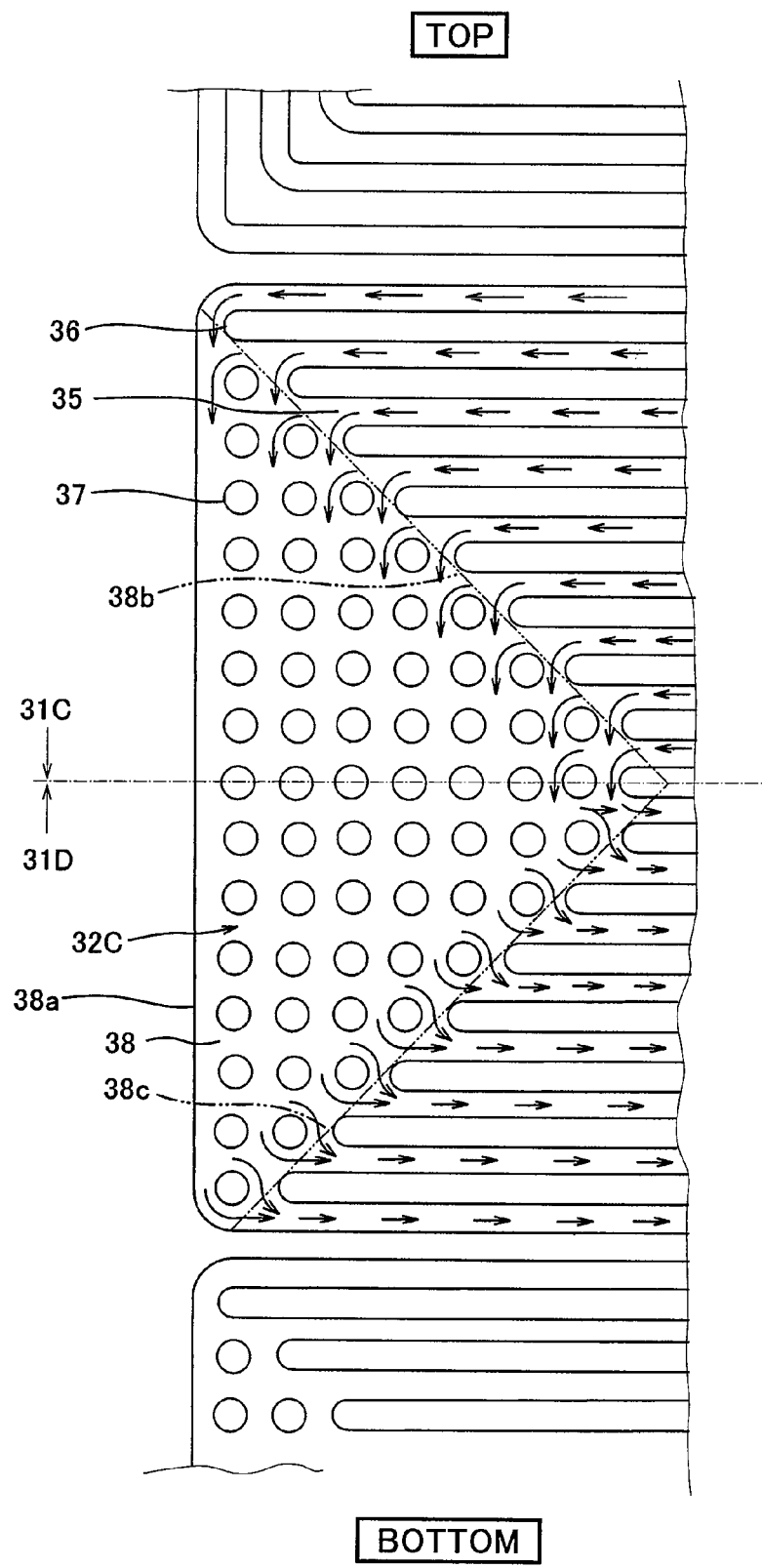
FIG. 9 is an enlarged view of the C region in FIG. 6.

FIG. 6 is a view illustrating a surface of a cathode separator.
FIG. 7 is a cross-sectional view of the cathode separator taken along line VII-VII in FIG. 6. FIG. 8 is a cross-sectional view of the cathode separator taken along line VIII-VIII in FIG. 6. FIG. 9 is an enlarged view of a region C in FIG. 6.

It should be noted that in FIGS. 6 and 9, the terms "top" and "bottom" refer to the upper direction and the lower direction, respectively, in an installation condition of the fuel cell stack 100 in which the cathode separator 3 is incorporated, and in FIG. 6, the terms "first side" and "second side" refer to the right or left direction and the left or right direction, respectively, in an installation condition of the fuel cell stack 100 in which the cathode separator 3 is incorporated.

As will be understood from FIG. 6, the oxidizing gas passage region 102 comprises the oxidizing gas flow splitting region set 31 and the oxidizing gas flow merge region set 32, which are formed in a serpentine shape in a region 202 of the surface of the cathode separator 3 that is in contact with the electrode portion 5 of the MEA 1.

The oxidizing gas flow splitting region set 31 comprises first, second, third, fourth, and fifth oxidizing gas flow splitting regions 31A, 31B, 31C, 31D and 31E, defined in that order from top to bottom, that have different numbers of the oxidizing gas passage grooves 35.

The oxidizing gas flow merge region set 32 include a first oxidizing gas flow merge region 32A interposed between the first oxidizing gas flow splitting region 31A and the second oxidizing gas flow splitting region 31B, a second oxidizing gas flow merge region 32B (intermediate flow merge region) interposed between the second oxidizing gas flow splitting region 31B and the third oxidizing gas flow splitting region 31C, a third oxidizing gas flow merge region 32C (intermediate flow merge region) interposed between the third oxidizing gas flow splitting region 31C and the fourth oxidizing gas flow splitting region 31D, and a fourth oxidizing gas flow merge region 32D interposed between the fourth oxidizing gas flow splitting region 31D and the fifth oxidizing gas flow splitting region 31E.

Here, as illustrated in FIG. 6, the first oxidizing gas flow splitting region 31A is formed by one linear portion 702 of the serpentine-shaped oxidizing gas passage grooves 25. Likewise, the third oxidizing gas flow splitting region 31C is also formed by one linear portion. Further, the fifth oxidizing gas flow splitting region 31C is also formed by one linear portion of the serpentine-shaped oxidizing gas passage grooves 25.

On the other hand, the second oxidizing gas flow splitting region 31B is formed by combining two linear portions 702 and one turn portion 701 of the serpentine-shaped oxidizing gas passage grooves 25. This second oxidizing gas flow splitting region 31B is formed so that the number of passage grooves in the linear portions 702 and the number of passage grooves in the turn portion connected to that linear portion 702 are the same.

Likewise, the fourth oxidizing gas flow splitting region 31D is formed by combining two linear portions (not shown with reference numeral) and one turn portion (not shown with reference numeral). This fourth oxidizing gas flow splitting region 31D is also formed so that the number of passage grooves in the linear portions and the number of passage grooves in the turn portion connected to that linear portion are the same.

The first oxidizing gas flow merge region 32A is formed in a turn portion interposed between the first oxidizing gas flow splitting region 31A and the second oxidizing gas flow splitting region 31B. The second oxidizing gas flow merge region 32B is formed in a turn portion interposed between the second oxidizing gas flow splitting region 31B and the third oxidizing gas flow splitting region 31C. Further, the third oxidizing gas flow merge region 32C is formed in a turn portion interposed between the third fuel gas flow splitting region 31C and the fourth fuel gas flow splitting region 31D. In addition, the fourth oxidizing gas flow merge region 32D is formed in a turn portion interposed between the fourth oxidizing gas flow splitting region 31D and the fifth oxidizing gas flow splitting region 31E.

By forming the flow splitting regions (the second and fourth oxidizing gas flow splitting regions 31B and 31D) containing linear portions and turn portions in this way, relatively long passage grooves can be formed, as already discussed previously. In other words, the passage length per each one passage groove contained in a flow splitting region disposed between two flow merge regions can be made long. With such a passage groove with a long passage length, even when water droplets are produced in the passage groove, the difference between the gas pressure applied on the upstream side of the water droplets and the gas pressure applied on the downstream side thereof becomes large, and therefore, good drainage characteristics can be obtained.

As illustrated in FIG. 2, a linear portion 702 of the first oxidizing gas flow splitting region 31A, which is disposed on the most upstream side of the five flow splitting regions, is connected to the oxidizing gas manifold port 13A (gas inlet manifold), and a linear portion of the fifth flow splitting region 31E, which is disposed on the most downstream side of the five flow splitting regions, is connected to the oxidizing gas manifold port 13B (gas outlet manifold).

In other words, the present embodiment employs a configuration in which the flow merge region is disposed neither immediately after the oxidizing gas manifold port 13A (gas inlet manifold) nor immediately before the oxidizing gas manifold port 13B (gas outlet manifold). As already mentioned previously, by employing this configuration, it becomes easily possible to prevent a portion of the oxidizing gas from flowing into the gap (not shown) formed between the outer peripheral edge of the electrode portion 5 (gas dispersion electrode, cathode) of the MEA 1 and the inner peripheral edge of the ring-shaped gasket disposed on the outer side of the MEA 1 when assembling the fuel cell stack 10. Thereby, the structure of the gas seal for preventing the oxidizing gas from flowing into the just-mentioned gap can be made simpler, and moreover, the structure can be easily formed.

It should be noted that when the flow merge region is not disposed immediately after the oxidizing gas manifold port 13A (gas inlet manifold) [when the turn portion is not disposed immediately after the oxidizing gas manifold port 13A (gas inlet manifold) either], it is possible that the fifth flow splitting region 31E, which is disposed on the most downstream side of the five flow splitting regions, may have a turn portion (not shown) in which no flow merge region is formed, and that turn portion may be connected to the oxidizing gas manifold port 13B (gas outlet manifold). In this case as well, the structure for preventing a portion of the reaction gas from flowing into the above-described gap can be made simple, and the structure can be formed easily.

Here, the locations of the first, second, third and fourth oxidizing gas flow merge regions 32A, 32B, 32C, and 32D and the number of grooves of the oxidizing gas passage grooves 35 in the first, second, third, fourth, and fifth oxidizing gas flow splitting regions 31A, 31B, 31C, 31D, and 31E are determined so that the respective flow rates of the oxidizing gas flowing through the oxidizing gas passage grooves 35 in the first, second, third, fourth, and fifth oxidizing gas flow splitting regions 31A, 31B, 31C, 31D, and 31E are appropriate rates suitable for condensed water drainage and are also in agreement with each other, taking into consideration the amount of the oxidizing gas consumed for power generation that flows through the oxidizing gas passage grooves 35.

Such a configuration is suitable since it achieves a uniform supply of the oxidizing gas over the entire surface of the electrode portion 5 and ensures the drainage performance of the condensed water produced due to the fuel cell power generation that is effected by the oxidizing gas appropriately even in the downstream side (in the vicinity of the oxidizing gas manifold port 13B), in which the amount of the oxidizing gas is less and the condensed water tends to remain.

In this embodiment, as illustrated in FIG. 6, the second oxidizing gas flow splitting region 31B, which is on the downstream side of the first oxidizing gas flow merge region 32A, is configured so as to turn the first oxidizing gas flow splitting region 31A on the upstream side with the first oxidizing gas flow merge region 32A interposed therebetween, but is not configured so that the oxidizing gas flow merge region is provided for all the turn portions located on both side end portions thereof.

In other words, in the cathode separator 3, there exist both a turn portion comprising a oxidizing gas flow merge region in which a plurality of protrusions 37 are formed in a recessed portion (described later) and a turn portion comprising a plurality of oxidizing gas passage grooves 35 bent in an angular C-shape, from the viewpoint of make the flow rate of the oxidizing gas flowing through the oxidizing gas passage grooves 35 uniform at a rate suitable for condensed water drainage.

More specifically, in the present embodiment, in the first oxidizing gas flow splitting region 31A, 11 rows of the oxidizing gas passage grooves 35 are configured so that they extend from the oxidizing gas manifold port 13A on the second side toward the first side and reach the first oxidizing gas flow merge region 32A.

In addition, in the second oxidizing gas flow splitting region 31B, 10 rows of the oxidizing gas passage grooves 35 are configured so that they extend from the downstream side of the first oxidizing gas flow merge region 32A located at a turn portion on the first side toward the second side, turning 180 degrees at one location, and reach the second oxidizing gas flow merge region 32B.

In addition, in the third oxidizing gas flow splitting region 31C, 9 rows of the oxidizing gas passage grooves 35 are configured so that they extend from the downstream side of the second oxidizing gas flow merge region 32B located at a turn portion on the first side toward the second side and reach the third oxidizing gas flow merge region 32C.

In addition, in the fourth oxidizing gas flow splitting region 31D, 8 rows of the oxidizing gas passage grooves 35 are configured so that they extend from the downstream side of the third oxidizing gas flow merge region 32C located at a turn portion on the second side toward the first side, turning 180 degrees at one location, and reach the fourth oxidizing gas flow merge region 32D.

In addition, in the fifth oxidizing gas flow splitting region 31E, 7 rows of the oxidizing gas passage grooves 35 are configured so that they extend from the downstream side of the third oxidizing gas flow merge region 32D located at a turn portion on the second side toward the first side and reach the oxidizing gas manifold port 13B.

As illustrated in FIG. 7, the transverse cross section of the first oxidizing gas flow splitting region 31A is formed in which a convex-concave pattern comprising a plurality of concave portions 35 (eleven concave portions herein) and a plurality of convex portions 36 (eleven convex portions herein) having a uniform pitch P2, a uniform width W3 and W4, and a uniform level difference D3. The concave portions 35 correspond to the oxidizing gas passage grooves 35 and the convex portions 36 correspond to ribs (support portions for the electrode portion 5) that make contact with and support the electrode portion 5.

With such a cross-sectional structure of the cathode separator 3, the electrode portion 5 of the MEA 1 makes contact with the convex portions 36 of the first oxidizing gas flow splitting region 31A, whereby the electrode portion 5 is supported uniformly by top faces of the convex portions 36 provided so as to have a uniform pitch P3, a uniform width W4, and a uniform level difference D3. Moreover, the electrode portion 5 sinks uniformly inside the oxidizing gas passage grooves 35 provided so as to have a uniform pitch P3, a uniform width W3, and a uniform level difference D3.

This is suitable since such a configuration prevents the non-uniformity in the pressure loss of the oxidizing gas between a plurality of oxidizing gas passage grooves 35 sufficiently when passing the oxidizing gas through the oxidizing gas passage grooves 35 of the first oxidizing gas flow splitting region 31A. Moreover, it is suitable because the non-uniformity of the oxidizing gas diffusion over the surface (i.e., across the direction perpendicular to the thickness direction of the electrode portion 5) in the electrode portion 5 can be suppressed sufficiently.

The cathode separator 3 having such a convex-concave pattern can be fabricated through metal molding (compression molding). Thereby, the cathode separator 3 can be constructed by a single plate, and as a result, productivity of the cathode separator 3 can be improved.

The configurations of the transverse cross sections of the second, third, fourth, and fifth oxidizing gas flow splitting regions 31B, 31C, 31D, and 31E are the same as the configuration described here, and are therefore not elaborated upon further.

As will be understood from FIGS. 8 and 9, the third oxidizing gas flow merge region 32C comprises a recessed portion 38 (concave-shaped region) that is connected to the oxidizing gas passage grooves 35 (concave portions 35) and a plurality of protrusions 37 in an island form (in a substantially cylindrical form herein) that vertically extend from the bottom face of the recessed portion 38.

It should be noted that as illustrated in FIG. 6, a recessed portion (not shown with reference numeral) similar to the just-mentioned recessed portion 38 and protrusions (not shown with reference numeral) similar to the just-mentioned protrusions 37 are formed also in the first oxidizing gas flow merge region 32A, the second oxidizing gas flow merge region 32B, and the fourth oxidizing gas flow merge region 32D. The configurations of the first oxidizing gas flow merge region 32A, the second oxidizing gas flow merge region 32B, and the fourth oxidizing gas flow merge region 32D are the same as that of the third oxidizing gas flow merge region 32C except for the number of passage grooves connected thereto, and are therefore not elaborated upon further.

The recessed portion 38 is formed on the surface of the cathode separator 3 so as to be located in a turn portion on the second side of the serpentine-shaped oxidizing gas passage region 102. This recessed portion 38 is formed into a substantially right triangular shape having a base 38a extending vertically and a pair of hypotenuses 38b and 38c having 45-degree included angles with the base 38a when viewed from the surface of the cathode separator 3. The base 38a constitutes the outer end (side edge) of the turn portion of the oxidizing gas passage region 102, the upper hypotenuse 38b constitutes the boundary with the third oxidizing gas flow splitting region 31C, and the lower hypotenuse 38c constitutes the boundary with the fourth oxidizing gas flow splitting region 31D. Each of the oxidizing gas passage grooves 35 of the third oxidizing gas flow splitting region 31C is connected to the recessed portion 38 at the upper hypotenuse 38b, while each of the oxidizing gas passage grooves 35 of the fourth oxidizing gas flow splitting region 31D is connected to the recessed portion 38 at the lower hypotenuse 38c. Herein, the recessed portion 38 is formed to have the same depth as that of the oxidizing gas passage grooves 35.

As illustrated in FIGS. 8 and 9, a plural number (63 herein) of the protrusions 37 are formed at a uniform pitch P4 on the extended lines of each of the convex portions 36 (except for the topmost one of the convex portions 36) of the third and fourth oxidizing gas split passages 31C and 31D. The pitch P4 herein is the same as the pitch P3 of the convex portions 36 of each of the oxidizing gas flow splitting regions 31C and 31D. Moreover, as illustrated in FIG. 8, all the protrusions 37 have a uniform height (level difference) D4 and the same shape.

It should be noted that the protrusions 37 are disposed and arranged in an orthogonal grid shape so that their centers are in agreement with an extending direction (vertical direction) of the base 38a of the recessed portion 38 and with the direction (horizontal direction along the extended lines of the convex portions 36) perpendicular to this extending direction.

The protrusions 37 function as the gas flow disturbing pieces for promoting mixing of the oxidizing gas and also function as the support portions (ribs) for the electrode portion 5 of the MEA 1.

The configurations of the first, second, and fourth fuel gas flow merge regions 32A, 32B, and 32D are the same as the configuration described here (more accurately, the shapes of the recessed portions 38 are geometrically similar), and therefore the descriptions of the configurations thereof will be omitted.

Such an cathode separator 3 (particularly the configuration of the oxidizing gas flow merge regions) makes it possible to obtain the following advantageous effects regarding the oxidizing gas mixing promotion, oxidizing gas flow rate uniformity, and oxidizing gas pressure uniformization between a plurality of oxidizing gas passage grooves 35.

First, since the first, second, third and fourth oxidizing gas flow merge regions 32A, 32B, 32C, and 32D are formed so as to have oblique linear boundaries with the oxidizing gas flow splitting regions, the oxidizing gas flows in a good condition through the third oxidizing gas flow merge region 32C almost uniformly, as indicated by the arrows in FIG. 9, for example. Therefore, the oxidizing gas distribution performance for the downstream oxidizing gas passage grooves 35 (the oxidizing gas passage grooves 35 of the fourth oxidizing gas flow splitting region 31D) does not degrade, making it possible to keep the uniformity of oxidizing gas flow rate in a good condition (in a condition in which variations of the gas flow rate are reduced further sufficiently).

Second, since the second, third, and fourth oxidizing gas flow merge regions 32B, 32C, and 32D are defined in a shape protruding in an arc shape as described above, more specifically, in a substantially triangular shape, the oxidizing gas can be allowed to flow substantially over the entire area of the recessed portion 38 so that it can be sent out to the corners of the recessed portion 38 appropriately. Therefore, the oxidizing gas distribution performance to the oxidizing gas passage grooves 35 downstream from the recessed portion 38 does not degrade, and the uniformity in the oxidizing gas flow rate can be improved (i.e., variations in the gas flow rate can be reduced further sufficiently). Moreover, the passage lengths of the 9 rows of the oxidizing gas passage grooves 35 in the third oxidizing gas flow splitting region 31C connecting the second oxidizing gas flow merge region 32B and the third oxidizing gas flow merge region 32C are set to be equal to each other, and thereby, the flow rate uniformization of the oxidizing gas flowing through these oxidizing gas passage grooves 35 is not inhibited.

Likewise, the passage lengths of the 8 rows of the oxidizing gas passage grooves 35 in the fourth oxidizing gas flow splitting region 31D connecting the third oxidizing gas flow merge region 32C and the fourth oxidizing gas flow merge region 32D are set to be equal to each other, and thereby, the flow rate uniformization of the oxidizing gas flowing through these oxidizing gas passage grooves 35 is not inhibited.

Third, the flow of the oxidizing gas flowing from the oxidizing gas passage grooves 35 of the oxidizing gas flow merge region set 31 into the oxidizing gas flow merge region set 32 is disturbed by the plurality of protrusions 37 arranged in an island form in the recessed portion 38, whereby the mixing of the oxidizing gas between the oxidizing gas passage grooves 35 can be promoted.

Fourth, all the oxidizing gas passage grooves 35 of the oxidizing gas flow splitting region set 31 are gathered in the oxidizing gas flow merge region set 32, in which pressure uniformization of the oxidizing gas can be achieved.

Fifth, it becomes possible to finely adjust the numbers of grooves of the oxidizing gas passage grooves 35 necessary for the respective oxidizing gas flow splitting regions 31A, 31B, 31C, 31D, and 31E by the oxidizing gas flow merge regions 32A, 32B, 32C, and 32D, which function as the relay parts that can change the number of grooves as desired. As a result, fine tuning of the oxidizing gas flow rate can be performed in which the amount of oxidizing gas consumed while the oxidizing gas is flowing through the oxidizing gas passage grooves 35 is taken into consideration.

Next, an example of the operation of a fuel cell 10 according to the present embodiment is described.

The electrode portion 5 that is in contact with the anode separator 2 is, as illustrated in FIG. 3, exposed to the fuel gas, which passes through each of the fuel gas passage grooves 25 at a uniform flow rate, at the openings of the upper end of each of a plurality of the fuel gas passage grooves 25 (concave portions 25).

The electrode portion 5 that is in contact with the cathode separator 3 is, as illustrated in FIG. 7, exposed to the oxidizing gas, which passes through each of the oxidizing gas passage grooves 35 at a uniform flow rate, at the openings of the upper end of each of a plurality of the oxidizing gas passage grooves 35 (concave portions 35).

For this reason, the fuel gas diffuses uniformly into the electrode portion 5 over the entire surface area of the electrode portion 5 while the fuel gas is flowing through the fuel gas passage region 101, and the oxidizing gas diffuses uniformly into the electrode portion 5 over the entire surface area of the electrode portion 5 while the oxidizing gas is flowing through the oxidizing gas passage region 102. As a result, the power generating operation by the fuel cell 10 can be performed uniformly over the entire surface of the electrode portion 5.

Second Embodiment

The inventors of the present application determine that in order to obtain higher performance of the fuel cell system, it is essential to achieve optimal design of the reaction gas flow merge region including the adjacent region thereto of the separator (hereinafter referred to as "passage turn adjacent portion") when a gas-liquid two-phase flow containing condensed water and a reaction gas (such as air or a fuel gas), which makes it possible to prevent the flooding resulting from the excessive condensed water in the gas passage grooves appropriately. In other words, there is concern that in the structure of the passage turn adjacent portions according to the first embodiment, the gas-liquid two-phase flow may easily pass through, for example, the gaps (grid-shaped grooves) between the protrusions 27 arranged in columns and rows or the gaps between the protrusions 27 and the base 28a, shown in FIG. 2, without being mixed appropriately when the gas-liquid two-phase flowing from each of the gas passage grooves into the flow merge region set (recessed portions) moves from above downward.

In view of this, the present embodiment as well as later-described third and fourth embodiments describe design examples for improvement against the flooding in the passage turn adjacent portions.

It should be noted that in the second, third, and fourth embodiments, the improvement design examples will be described taking a passage turn adjacent portion in the vicinity of the first fuel gas flow merge region 22A of the anode separator 2 shown in FIG. 2 as an example, for simplicity in description. However, the present improvement design techniques will be applicable to other flow merge regions.

Figure 10:
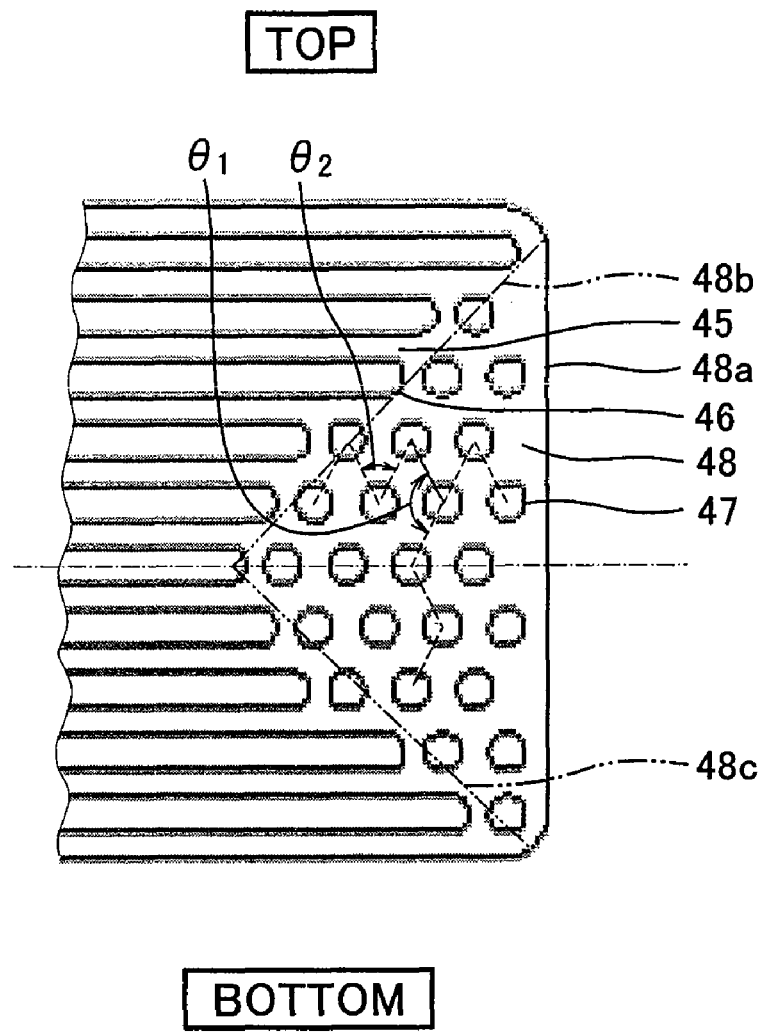
FIG. 10 is a view of the configuration of a passage turning adjacent portion, viewed in plan, according to a second embodiment.

FIG. 10 is a view of the configuration of a passage turning adjacent portion, viewed in plan, according to the present embodiment.

It should be noted that the configurations of the separator in the present embodiment are the same as those described in the first embodiment except for the configuration of the passage turn adjacent portion, and therefore, the descriptions of the configurations common to both will be omitted or outlined.

Referring to FIG. 10, a recessed portion 48 connected to fuel gas passage grooves 45 (concave portions 45) is defined in a substantially triangular shape by a base 48a extending linearly in a vertical direction, as an outer end of the passage turn adjacent portion, and a pair of hypotenuses 48b and 48c, as the boundaries with the fuel gas passage grooves 45 on both upstream and downstream sides.

A plurality of protrusions 47 in an island form (in a substantially cylinder form, more precisely a substantially right circular cylindrical form) vertically extend from the bottom face of the recessed portion 48 is arrayed regularly in what is called a zigzag form along the extended lines of the convex portions.

More specifically, the plurality of the protrusions 47 is so formed to be lined up at a uniform pitch along an extending direction (i.e., vertical direction) of the base 48a and be lined up at a uniform pitch along a direction perpendicular to the extending direction of the base 48a (i.e., horizontal direction). Hereinbelow, a continuum of the protrusions 47 along a vertical direction (including the case of only one protrusion) is referred to as a "column," and the continuum of the protrusions 47 along a horizontal direction is referred to as a "row" (including the case of only one protrusion). Accordingly, the plurality of the protrusions 47 are formed to have 8 columns (respectively referred to as the first column through the eighth column in that order from the vertex of the recessed portion 48) and 9 rows (respectively referred to as the first row through the ninth row in that order from the top). Each column comprises the protrusions 47 that constitute every other row. Conversely, each row comprises the protrusions 47 that constitute every other column. In other words, in adjacent columns, the positions of the protrusions 47 along the extending direction of the columns (vertical direction) are out of alignment by half a pitch from each other. Likewise, in adjacent rows, the positions of the protrusions 47 along the extending direction of the rows (horizontal direction) are out of alignment by half a pitch from each other. In each row, the protrusions 47 are disposed at a pitch two times the diameter thereof (i.e., spaced with a gap equal to the diameter thereof), and in each column, the protrusions 47 are disposed at a pitch four times its diameter (i.e., spaced with a gap equal to three times as large as the diameter thereof).

Thus, the lines connecting the centers of the protrusions 47 in the adjacent columns with each other, or the lines connecting the centers of the protrusions 47 in the adjacent rows with each other, extend in such a manner as to bend in a V-shape in a vertical direction along the base 48a, or in a horizontal direction on an extended line of the convex portions 46.

For example, the lines connecting the centers of the protrusions 47 in adjacent columns with each other in a vertical direction (see the dotted lines in FIG. 10) extend in zigzag form so that they are bent at an obtuse angle ($\theta_1$ shown in FIG. 10 being about 127 degrees) over a plurality of times, while the lines connecting the centers of the protrusions 47 in adjacent rows with each other in a horizontal direction (see the dotted lines in FIG. 10) extend in zigzag form so that they are bent at an acute angle ($\theta_2$ shown in FIG. 10 being about 53 degrees).

It is expected that when the gas-liquid two-phase flow travels from above downward in the recessed portion 48, the protrusions 47 arranged regularly in zigzag form make it possible to hinder the gas-liquid two-phase flow from easily passing through the gaps between the protrusions 47 and to cause the gas-liquid two-phase flow to hit the protrusions 47 appropriately a plurality of times to disturb the flow, and that thereby they can suppress the flooding due to the excessive condensed water in the fuel gas passage grooves 45 downstream from the recessed portion 48. It should be noted that such a flooding prevention effect has been proved by the calculation results of the fluid simulation and measurement results using an actual fuel cell, which will be described later.

As will be understood from the illustration in FIG. 10 and the foregoing description, the zigzag array of the protrusions 47 in the present specification is an array pattern of the protrusions 47 in which the columns extending parallel to a vertical direction are constituted by the protrusions 47 that constitute every other row (in other words, an array pattern of the protrusions 47 in which the rows extending parallel to a horizontal direction are constituted by the protrusions 47 that constitute every other column). For example, the zigzag array of the protrusions 47 in the present specification means, regarding the arrangement of the protrusions 47 in a vertical direction, a pattern in which the array of the protrusions 47 is disposed in zigzag form between the columns adjacent to each other so that, from the viewpoint of preventing the gas-liquid two-phase flow that passes through the gaps between the protrusions 47 in a certain row downwardly from passing through the next row without being disturbed in any way, the gas-liquid two-phase flow can hit the protrusions 47 in the next row.

Accordingly, the array pattern as illustrated in the present embodiment (FIG. 10; likewise in the later described fourth embodiment) in which the protrusions 47 in the adjacent columns are out of alignment by half the pitch of the protrusions 47 in the same rows is a typical example of the zigzag array of the protrusions 47, but the zigzag array is not limited thereto. For example, the gap between the protrusions in adjacent columns with each other may be ¼ the pitch of the protrusions in the same rows, as will be described later in modified example 5. That is, the array patterns of the protrusions in which "the gap between the protrusions in the adjacent columns with each other<half the pitch of the protrusions in the same rows" and "the gap between the protrusions in the adjacent columns with each other>half the pitch of the protrusions in the same rows" are also included in the zigzag array of the protrusions in the present specification, as far as the flooding prevention effect is obtained.

Third Embodiment

Figure 11:
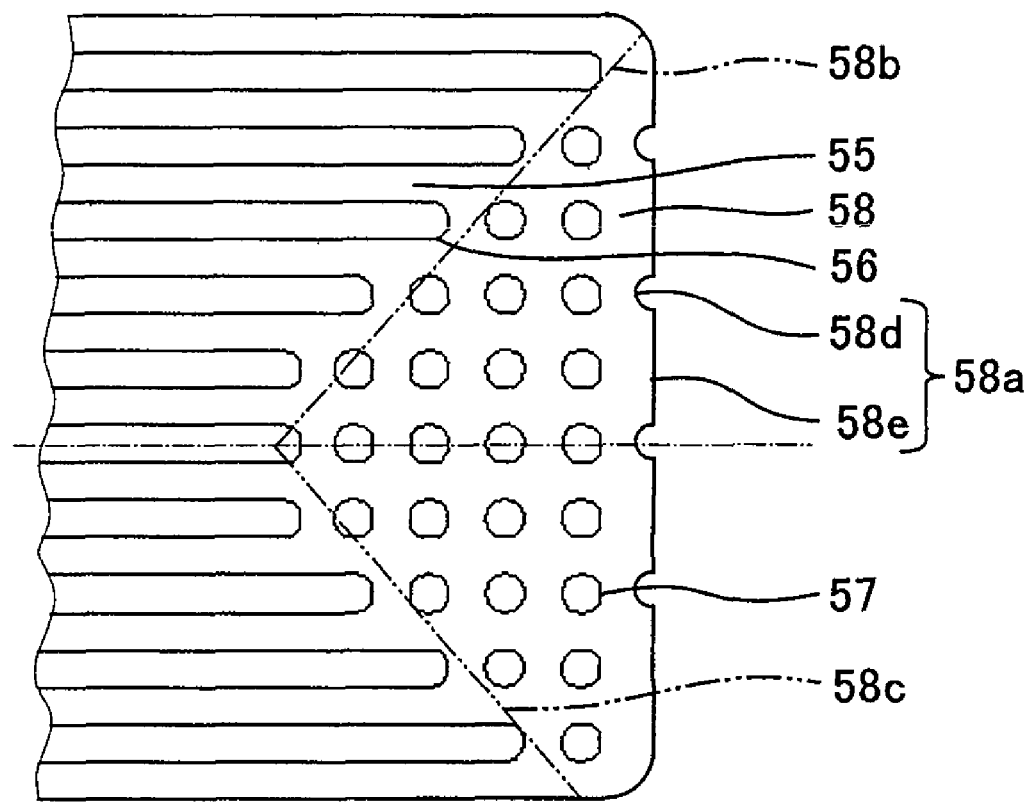
FIG. 11 is a view of the configuration of a passage turning adjacent portion, viewed in plan, according to a third embodiment.

FIG. 11 is a view of the configuration of a passage turning adjacent portion, viewed in plan, according to the present embodiment.

It should be noted that the configurations of the separator in the present embodiment are the same as those described in the first embodiment except for the configuration of the passage turn adjacent portion, and therefore, the descriptions of the configurations common to both will be omitted or outlined.

Referring to FIG. 11, a recessed portion 58 connected to fuel gas passage grooves 55 (concave portions 55) is defined in a substantially triangular shape by a base 58a extending in a vertical direction, as an outer end of the passage turn adjacent portion, and a pair of hypotenuses 58b and 58c, as the boundaries with the fuel gas passage grooves 55 on both upstream and downstream sides. A plurality of protrusions 57 vertically extend from the bottom face of the recessed portion 58 in an island form (in a substantially cylinder form, more precisely a substantially right circular cylindrical form) is disposed and arranged in an orthogonal grid shape so that their centers are in agreement with an extending direction (vertical direction) of the base 58a and with the direction (horizontal direction along the extended lines of the convex portions 56) perpendicular to this extending direction.

Here, the base 58a of the recessed portion 58 partially curves so that a plurality of (four) protruding pieces 58d (outer end protruding portions) protruding toward the recessed portion 58 and linear base portions 58e interposed between the protruding pieces 58d are formed therein.

It is expected that when the gas-liquid two-phase flow travels from above downward in the recessed portion 58, the protruding pieces 58d formed on the base 58a make it possible to hinder the gas-liquid two-phase flow from easily passing through the gaps between the protrusions 57 and the base 58a and to cause the gas-liquid two-phase flow to hit the protruding pieces 58d appropriately a plurality of times to disturb the flow, and that thereby they can suppress the flooding due to the excessive condensed water in the fuel gas passage grooves 55 downstream from the recessed portion 58. It should be noted that such a flooding prevention effect has been proved by the calculation results of the fluid simulation and measurement results using the actual fuel cell, which will be described later.

Fourth Embodiment

Figure 12:
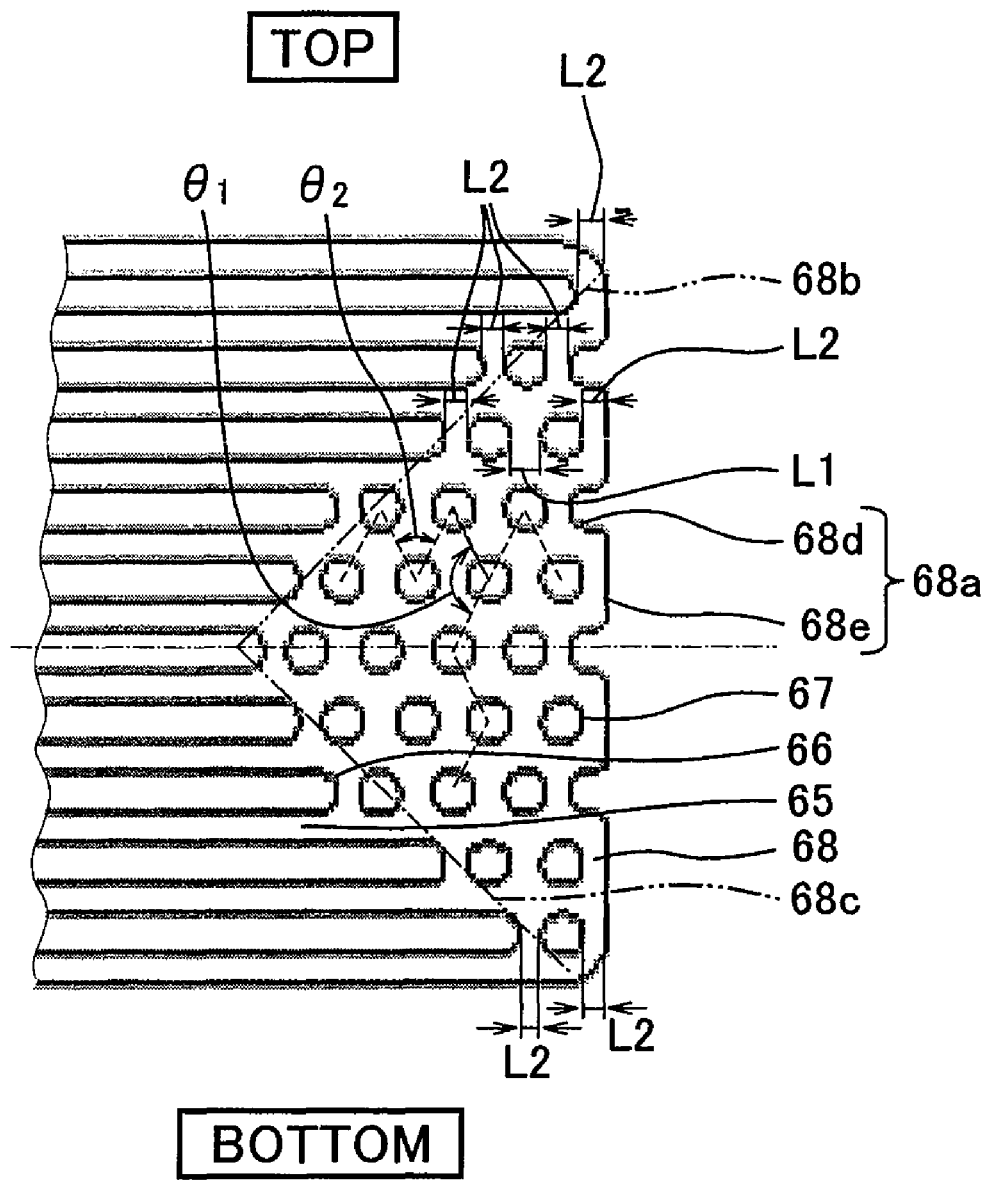
FIG. 12 is a view of the configuration of a passage turning adjacent portion, viewed in plan, according to a fourth embodiment.

FIG. 12 is a view of the configuration of a passage turning adjacent portion, viewed in plan, according to the present embodiment.

It should be noted that the configurations of the separator in the present embodiment are the same as those described in the first embodiment except for the configuration of the passage turn adjacent portion, and therefore, the descriptions of the configurations common to both will be omitted or outlined.

The configuration of the passage turn adjacent portion according to the present embodiment has an optimal design for uniform dispersion of the condensed water in the gas passage grooves, which employs both protrusions 67 formed in a zigzag array on the bottom face of a recessed portion 68 and protruding pieces 68d formed on a base 68a of a recessed portion 68.

Referring to FIG. 12, the recessed portion 68 connected to fuel gas passage grooves 65 (concave portions 65) is defined in a substantially triangular shape by a base 68a extending in a vertical direction, as an outer end of the passage turn adjacent portion, and a pair of hypotenuses 68b and 68c, as the boundaries with the fuel gas passage grooves 55 on both upstream and downstream sides.

A plurality of (24) protrusions 67 in an island form (in a substantially cylinder form, more precisely a substantially right circular cylindrical form) is arranged regularly in what is called a zigzag form.

More specifically, the plurality of the protrusions 67 is so formed to be lined up at a uniform pitch along an extending direction (i.e., vertical direction) of the base 68a and be lined up at a uniform pitch along a direction perpendicular to the extending direction of the base 68a (i.e., horizontal direction). Hereinbelow, a continuum of the protrusions 67 along a vertical direction (including the case of only one protrusion) is referred to as a "column," and the continuum of the protrusions 67 along a horizontal direction is referred to as a "row" (including the case of only one protrusion). Accordingly, the plurality of the protrusions 67 are formed to have 8 columns (respectively referred to as the first column through the eighth column in that order from the vertex of the recessed portion 48) and 9 rows (respectively referred to as the first row through the ninth row in that order from the top). Each column comprises the protrusions 67 that constitute every other row. Conversely, each row comprises the protrusions 67 that constitute every other column. In other words, in adjacent columns, the positions of the protrusions 67 along the extending direction of the columns (vertical direction) are out of alignment by half a pitch from each other. Likewise, in adjacent rows, the positions of the protrusions 67 along the extending direction of the rows (horizontal direction) are out of alignment by half a pitch from each other. In each row, the protrusions 67 are disposed at a pitch two times the diameter thereof (i.e., spaced with a gap equal to the diameter thereof), and in each column, the protrusions 67 are disposed at a pitch four times its diameter (i.e., spaced with a gap equal to three times as large as the diameter thereof).

Thus, the lines connecting the centers of the protrusions 67 in the adjacent columns with each other, or the lines connecting the centers of the protrusions 67 in the adjacent rows with each other, extend in such a manner as to bend in a V-shape in a vertical direction along the base 68a, or in a horizontal direction on an extended line of the convex portions 66.

For example, the lines connecting the centers of the protrusions 67 in adjacent columns with each other in a vertical direction (see the dotted lines in FIG. 12) extend in zigzag form so that they are bent at an obtuse angle ($\theta_1$ shown in FIG. 12 being about 127 degrees) over a plurality of times, while the lines connecting the centers of the protrusions 67 in adjacent rows with each other in a horizontal direction (see the dotted lines in FIG. 10) extend in zigzag form so that they are bent at an acute angle ($\theta_2$ shown in FIG. 12 being about 53 degrees).

Here, the base 68a of the recessed portion 68 shown in FIG. 12 partially curves so that a plurality of (four) protruding pieces 68d (outer end protruding portions) protruding toward the recessed portion 68 and linear base portions 68e interposed between the protruding pieces 68d are formed therein.

It is expected that when the gas-liquid two-phase flow travels from above downward in the recessed portion 68, the protrusions 67 arranged regularly in zigzag form make it possible to hinder the gas-liquid two-phase flow from easily passing through the gaps between the protrusions 67 and to cause the gas-liquid two-phase flow to hit the protrusions 67 appropriately a plurality of times to disturb the flow, and that thereby they can suppress the flooding due to the excessive condensed water in the fuel gas passage grooves 65 downstream from the recessed portion 68. It is also expected that when the gas-liquid two-phase flow travels from above downward in the recessed portion 68, the protruding pieces 68d formed on the base 68a make it possible to hinder the gas-liquid two-phase flow from easily passing through the gaps between the protrusions 67 and the base 68a and to cause the gas-liquid two-phase flow to hit the protruding pieces 68d appropriately a plurality of times to disturb the flow, and that thereby they can suppress the flooding due to the excessive condensed water in the fuel gas passage grooves 65 downstream from the recessed portion 68. It should be noted that such a flooding prevention effect has been proved by the calculation results of the fluid simulation and measurement results using the actual fuel cell, which will be described later.

Moreover, as illustrated in FIG. 12, the one substantially cylinder shaped protrusion 67 in the lowermost row (the ninth row) is disposed so as to be located between the tenth of convex portion 66 and a base portion 68e so that it is spaced at a distance L2 for the convex portion 66 and the base portion 68e.

In addition, the one protrusion 67 in the topmost row (the first row) is disposed so as to be located between the second row of convex portion 66 and the protruding pieces 68d so that it is spaced at a distance L2 for the convex portion 66 and the protruding pieces 68d.

In addition, the two protrusions 67 in the second row and the eighth row are disposed, so as to keep a distance L2 from the third and ninth rows of the convex portions 66 and from the base portions 68e, respectively, and so as to be located between the respective convex portions 66 and the respective base portions 68e so that they are spaced apart from each other at a distance L1 from each other and lined up in a horizontal direction.

In addition, the three protrusions 67 in the third row and the seventh row are disposed, so as to keep a distance L2 from the fourth and eighth rows of the convex portions 66 and from the protruding pieces 68d, respectively, and so as to be located between the respective convex portions 66 and the respective protruding pieces 68d so that they are spaced apart each other at a distance L1 from each other and lined up in a horizontal direction.

In addition, the four protrusions 67 in the fourth and sixth rows are disposed, so as to keep a distance L2 from the fifth and seventh rows of the convex portions 66 and from the base portions 68e, respectively, and so as to be located between the respective convex portions 66 and the respective base portions 68e so that they are spaced apart from each other at a distance L1 from each other and lined up in a horizontal direction.

In addition, the four protrusions 67 in the fifth row are disposed so as to keep a distance L2 from the sixth row of the convex portion 66 and from the base portion 68d, respectively, and so as to be located between the convex portion 66 and the protruding pieces 68d so that they are spaced apart from each other at a distance L1 from each other and lined up in a horizontal direction.

It should be noted that no protrusion 67 exists between the topmost row (first row) of the convex portion 66 and the base portion 68e, and they are disposed spaced at a distance L2 so as to oppose each other.

It has been found through the later-described fluid analysis simulation that the flow rate of the reaction gas accelerates in the gaps between the protrusions 67 and the convex portions 66, between the protrusions 67 and the protruding pieces 68d, and between the convex portions 66 and the protruding pieces 68d. For this reason, they are made narrower than the distance L1 between the substantially cylinder shaped protrusions 67, as illustrated in FIG. 12. A specific design guideline for the distances L1 and L2 is as follows. The distance L1 and the distance L2 are set in such a manner that the product of the distance L1 and the flow rate of the reaction gas passing across the distance L1 when the distance L1 and the distance L2 are assumed to be the same will substantially match the product of the distance L2 and the flow rate of the reaction gas passing across the distance L2 when the distance L1 and the distance L2 are assumed to be the same.

By setting the distances L1 and L2 in this way, uniformization of the flow rate distribution of the gas-liquid two-phase flowing in the recessed portion 68 over the entire surface can be adjusted by the passage resistance exhibited by the distance L2 appropriately.

(Verification of Flooding Prevention Effect by Analysis Simulation)

Next, the inventors of the present application have verified the flooding prevention effect of the protrusions and protruding pieces in the passage turn adjacent portion described in the first and fourth embodiments by modeling a passage turn adjacent portion for passing the gas-liquid two-phase flow containing condensed water and reaction gas on a computer and utilizing the thermo-fluid simulation technology detailed below.

<Analysis Simulator>

The present fluid simulation has been conducted using a general-purpose thermo-fluid dynamics analysis software program "FLUENT" (registered trademark) made by Fluent Inc. in the U.S., Version: 6.2.16, a computational thermo-fluid dynamics analysis software program.

The FLUENT (registered trademark) uses a discretization technique called the finite volume method. It divides a region that is the analysis subject into small spaces made of predetermined elements, solves a general equation governing a fluid flow based on the balance of the fluid exchanged between the small elements, and executes repetitive computation with the computer until the result converges.

<Analysis Model>

Figure 13:
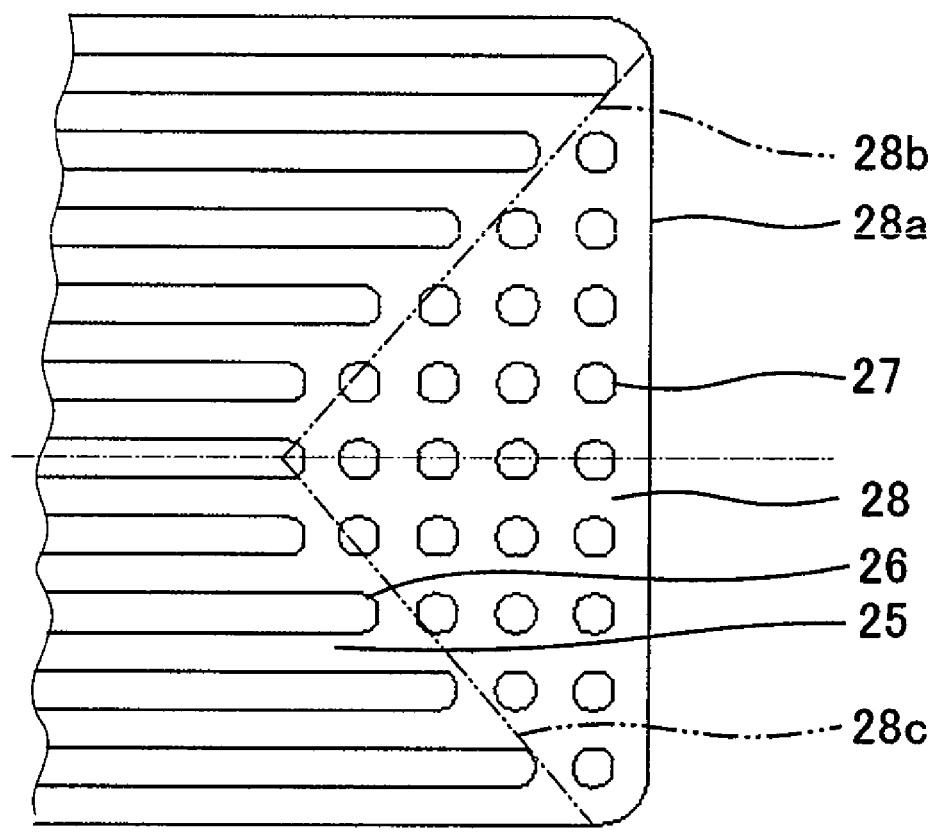
FIG. 13 is a view of the configuration of a first embodiment analysis model, viewed in plan.
Figure 14:
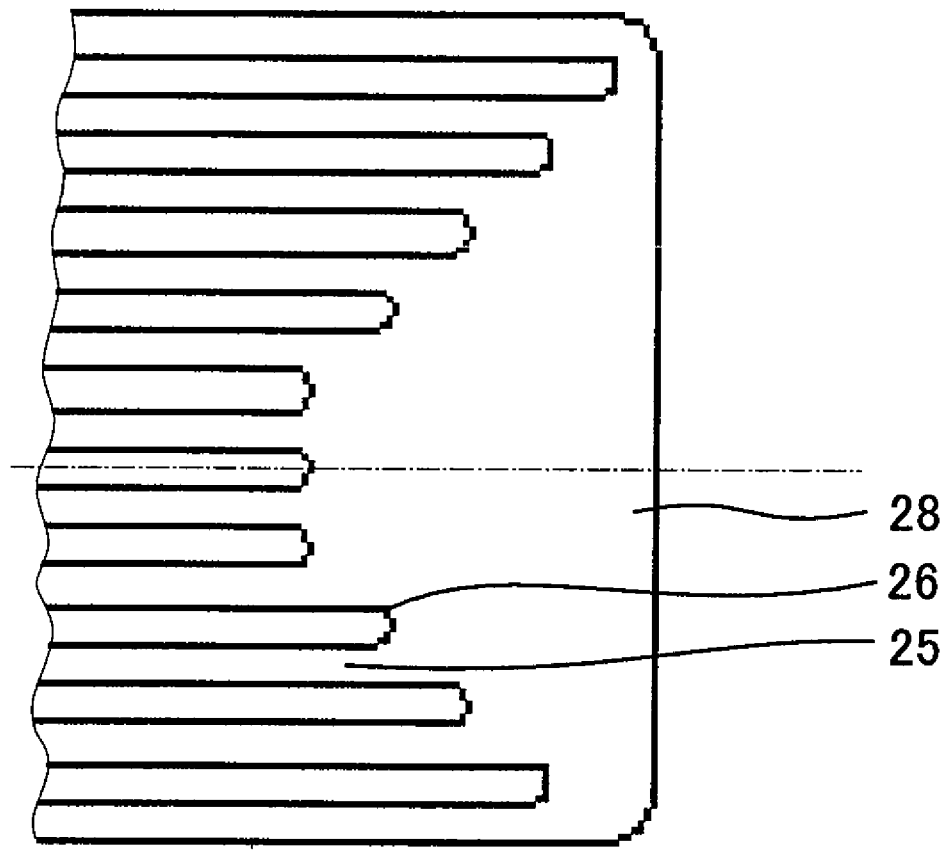
FIG. 14 is a view of the configuration of a comparative analysis model, viewed in plan.

Herein, the modeling of passage turn adjacent portions of a separator include an analysis model that employs, as illustrated in FIG. 13, the protrusions 27 vertically extended from the bottom face of the recessed portion 28 connected to the fuel gas passage grooves 25 (concave portions 25) and arranged in an array along the extended lines of the convex portions 26, which corresponds to the first fuel gas flow merge region 22A of FIG. 2 (which is hereinafter referred to as a "first embodiment analysis model"), an analysis model that employs the protrusions 67 in a zigzag array and the protruding pieces 68d on the base 68a in the recessed portion as shown in FIG. 12 (which is referred to as a "fourth embodiment analysis model"), and an analysis model in which the protrusions 27 formed in the bottom face of the recessed portion 28 are eliminated in the first embodiment analysis model as shown in FIG. 14 (which is hereinafter referred to as a "comparative analysis model").

The configurations (i.e., shapes) of these analysis models will be understood easily by referring to the descriptions and drawings hereinabove, and therefore the descriptions of the configurations will be omitted here.

As the analysis conditions (boundary conditions, etc.) in the analysis models, various data during a rated operation the fuel cell are adopted.

For example, the gas-liquid two-phase flow (flow rate: 2.34 m/s, for example) in which the mixing ratio of condensed water and the reaction gas is 1:1 is employed as an influent condition, a surface tension ($7.3 \times 10^{-2}$ N/m) is employed as water's physical property data, and a contact angle (0.1°, for example) is employed as the physical property or surface data of condensed water and separator.

In addition, a pressure (927.33 Pa, for example) and a pressure loss coefficient ($4.546 \times 10^9$/m$^2$ for example; note that the grooves on the downstream side are extended 40 mm longer than those on the upstream side, for the passage resistance increase on the downstream side) are adopted as the effluent conditions of a fluid.

Moreover, the wall surface is regarded as non-slip as to the flow rate of the gas-liquid two-phase flow.

<Analysis Results>

Figure 15:
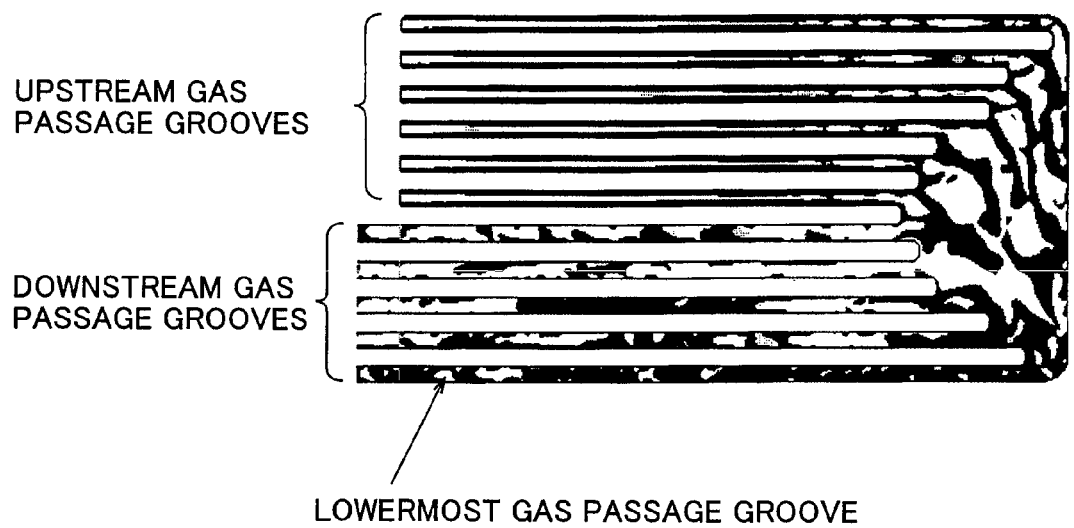
FIG. 15 is a view illustrating an example of the analysis result that is output on a computer based on the flow data of the elements according to the comparative analysis model.
Figure 16:
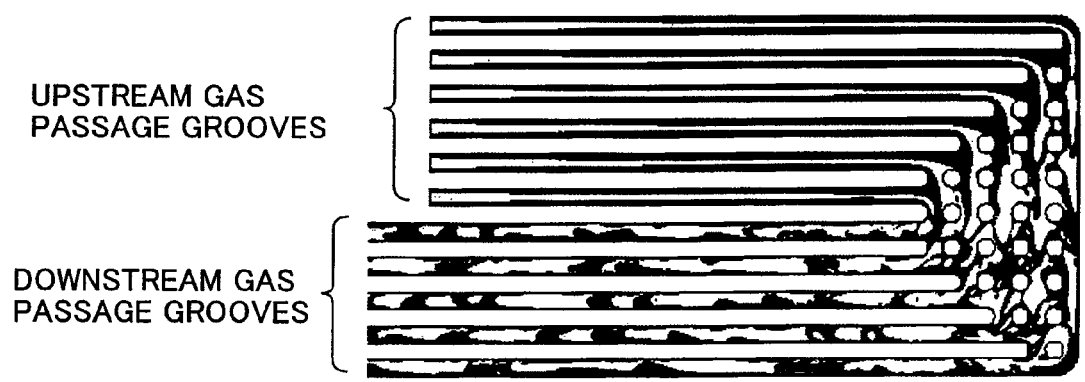
FIG. 16 is a view illustrating an example of the analysis result that is output on a computer based on the flow data of the elements according to the first embodiment analysis model.
Figure 17:
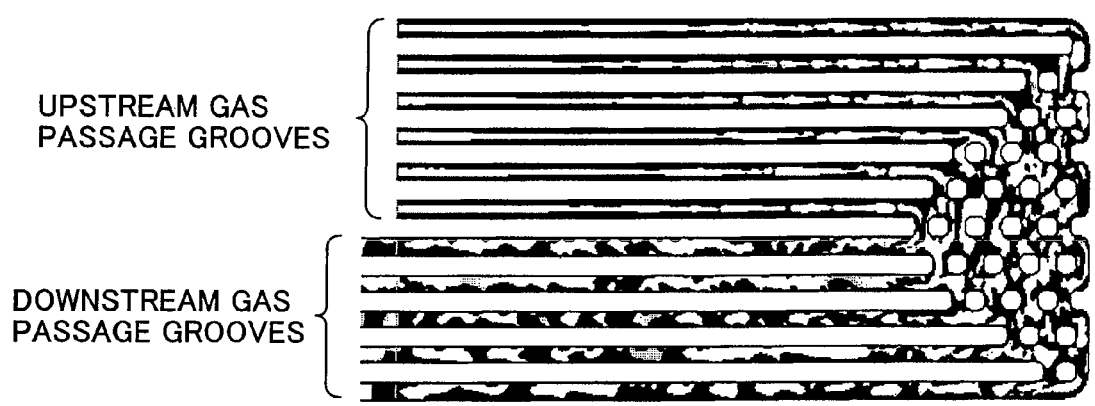
FIG. 17 is a view illustrating an example of the analysis result that is output on a computer based on the flow data of the elements according to the fourth embodiment analysis model.

FIGS. 15, 16, and 17 are views illustrating examples of the analysis results that are output on the computer based on the flow data of the elements according to the above-described analysis models.

Specifically, FIG. 15 depicts the distribution of condensed water (black) and the reaction gas (uncolored) at the time when the gas-liquid two-phase flow reached a steady state in the comparative analysis model, FIG. 16 depicts the same kind of view for the first embodiment analysis model, and FIG. 17 depicts the same kind of view for the fourth embodiment analysis model.

It has been confirmed that with the recessed portion of the comparative analysis model (FIG. 15), in which the protrusions are eliminated, it is difficult to mix the flow of the condensed water sent out from the gas passage grooves upstream from the recessed portion, and the dispersion of the condensed water to the gas passage grooves downstream from the recessed portion is not possible. The simulation result shown in FIG. 15 visualizes that, for example, a large amount of condensed water is flowing into the lowermost row of the gas passage groove downstream from the recessed portion and consequently the groove has been plugged up completely by the condensed water.

It has confirmed that, in contrast, the protrusions arranged vertically in an orthogonal grid shape in the recessed portion, according to the first embodiment analysis model (FIG. 16), make it possible to mix the flow of the condensed water sent out from the gas passage grooves upstream from the recessed portion, and achieve a certain degree of dispersion of the condensed water into the gas passage grooves downstream from the recessed portion. However, the simulation result shown in FIG. 16 visualizes that a relatively large amount of condensed water is flowing into part of the gas passage grooves downstream from the recessed portion, for example, into the lowermost row of the gas passage groove in the recessed portion on the downstream side, and as a consequence, the condensed water is beginning to plug up the groove.

Further, it has been confirmed that the protrusions arranged vertically in zigzag form and the base protruding pieces in the recessed portion according to the fourth embodiment analysis model (FIG. 17) make it possible to sufficiently disturb the flow of the condensed water sent out from the gas passage grooves upstream from the recessed portion, and achieve remarkably good dispersion of the condensed water into the gas passage grooves downstream from the recessed portion. The simulation result shown in FIG. 17 visualizes that, for example, the condensed water is distributed and allowed to flow substantially uniformly over all the gas passage grooves downstream from the recessed portion.

It has been verified by the simulation results described above that a separator (cathode separator or anode separator) employing the first embodiment analysis model can suppress the flooding due to excessive condensed water in the gas passage grooves downstream from the recessed portion to a certain level. Moreover, it has been verified by the simulation results described above that a separator (cathode separator or anode separator) employing the fourth embodiment analysis model can appropriately prevent the flooding due to excessive condensed water in the gas passage grooves downstream from the recessed portion sufficiently.

(Verification of Flooding Prevention Effect by Fuel Cell)

The inventors of the present application have prepared a fuel cell which incorporates a separator according to the first embodiment as an anode separator and a cathode separator (hereinafter referred to as a "first embodiment fuel cell") and a fuel cell which incorporates a separator according to the fourth embodiment as an anode separator and a cathode separator (hereinafter referred to as a "fourth embodiment fuel cell") to measure changes of the cell voltage standard value versus the fuel utilization rate (Uf) of the fuel cells by operating these fuel cells.

Figure 18:
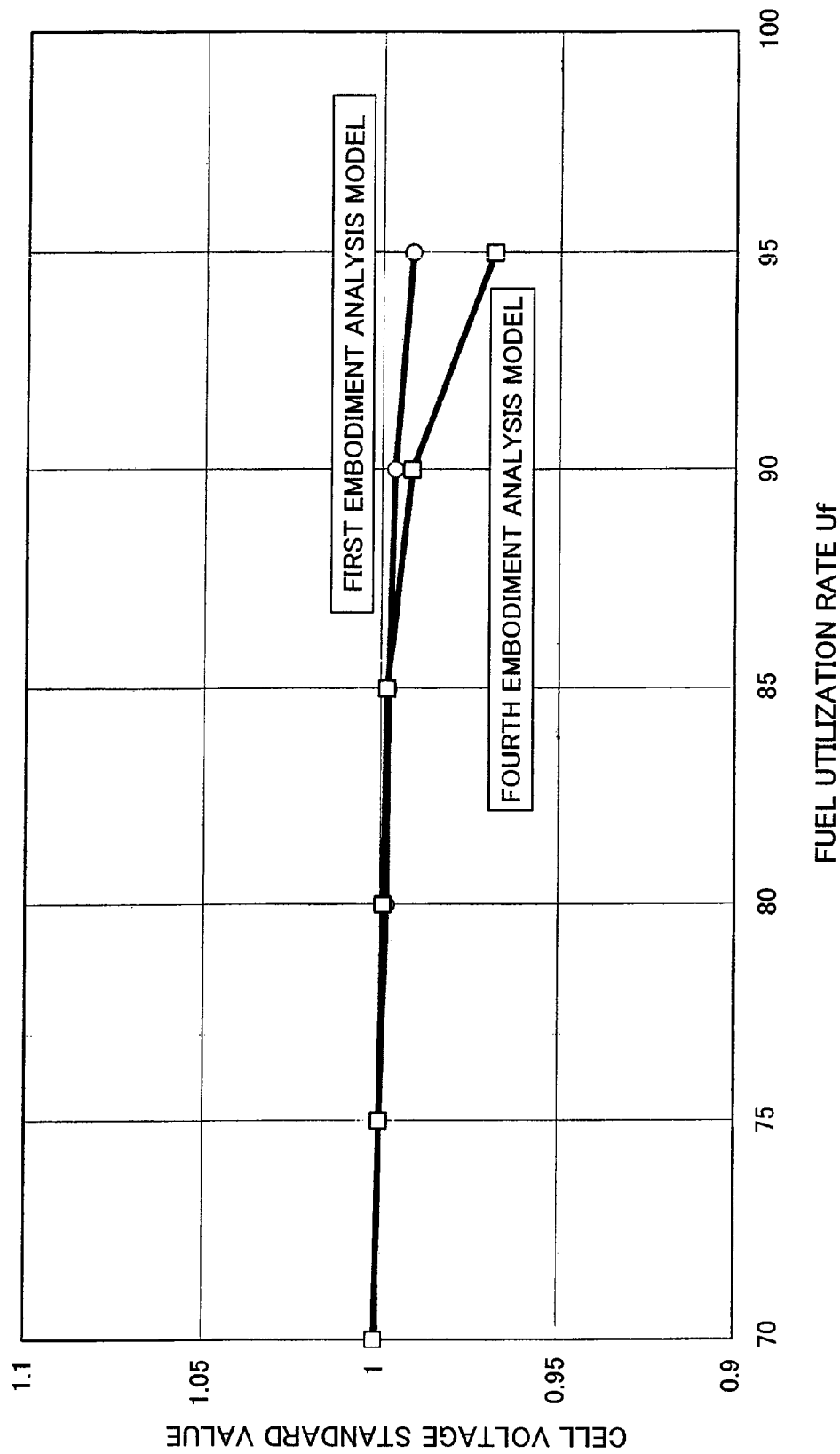
FIG. 18 is a graph illustrating the relationship between fuel utilization rate (Uf) and cell voltage standard value (cell voltage standard value at fuel utilization rate 70%=1) of the first embodiment fuel cell and the fourth embodiment fuel cell, wherein the horizontal axis represents fuel utilization rate and the vertical axis represents cell voltage standard value.

FIG. 18 is a graph illustrating the relationship between fuel utilization rate (Uf) and cell voltage standard value (cell voltage standard value at fuel utilization rate 70%=1) of a first embodiment fuel cell and a fourth embodiment fuel cell, wherein the horizontal axis represents fuel utilization rate and the vertical axis represents cell voltage standard value.

From FIG. 18, it is seen that the cell voltage standard value of the first embodiment fuel cell decreases as the fuel utilization rate (Uf) rises and that, in contrast, the degree of decrease in the cell voltage standard value of the fourth embodiment fuel cell is suppressed appropriately.

The inventors of the present application think that the difference in cell voltage standard value between the two cells observed in FIG. 18 arises because the fourth embodiment fuel cell is superior to the first embodiment fuel cell in the flooding prevention effect.

<Various Modified Examples of Arrangement of Protrusions in Passage Turn Adjacent Portion (Recessed Portion)>

The foregoing description has described examples of the protrusion arrangement in the passage turn adjacent portion (recessed portion) as represented by FIG. 5 (the first embodiment), in which a plurality of the protrusions 27 is arranged in an orthogonal grid shape (hereinafter abbreviated as "grid array protrusions") and the examples of the protrusion arrangement in the passage turn adjacent portion (recessed portion) as represented by FIG. 10 (the second embodiment), in which a plurality of the protrusions 47 is arranged regularly in zigzag form (hereinafter abbreviated as "zigzag array protrusions").

Hereinbelow, modified examples 1 through 4, in which the shape or the like of the protrusions in the grid array protrusions is partially changed, and modified example 5, in which the gap between the protrusions in adjacent columns in the zigzag array protrusions is made smaller than that of the gap shown in FIG. 10, will be described.

It should be noted that although the following modified examples 1 through 5 take an anode separator 2 as an example, the same discussion applied to a cathode separator 3.

MODIFIED EXAMPLE 1

Figure 19:
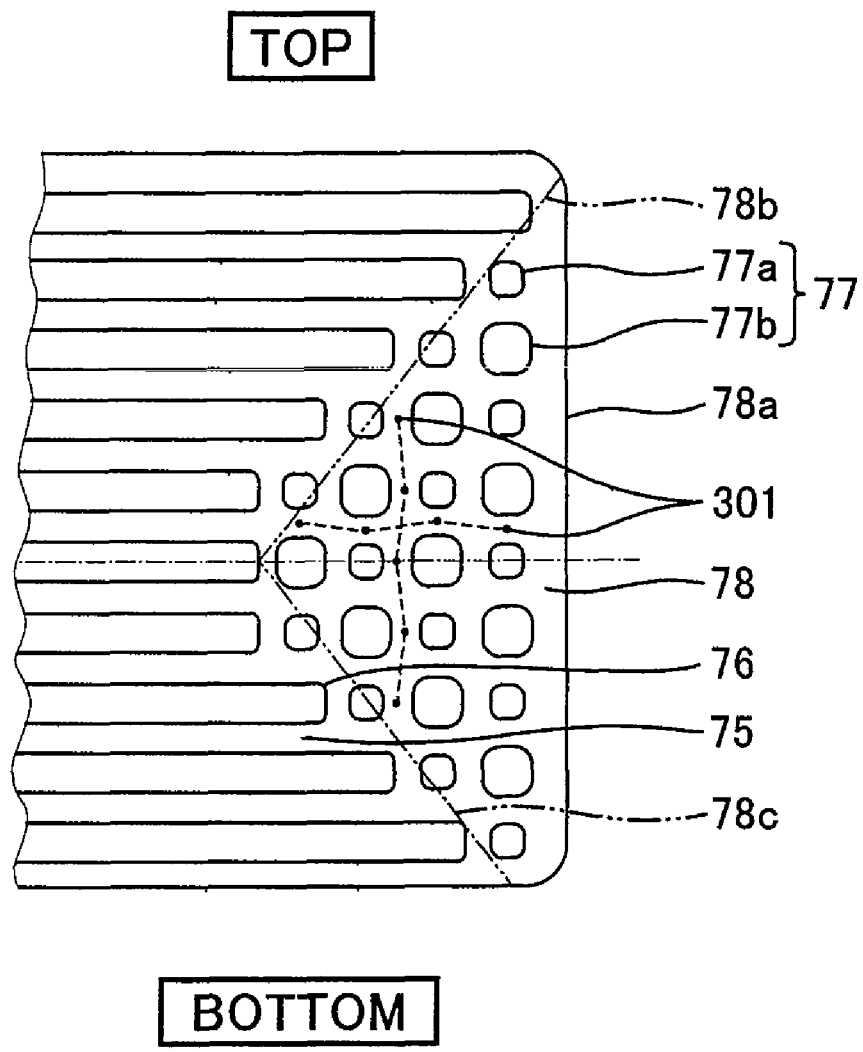
FIG. 19 is a view of the configuration of a passage turning adjacent portion, viewed in plan, according to modified example 1.

FIG. 19 is a view of the configuration of a passage turning adjacent portion, viewed in plan, according to modified example 1.

Referring to FIG. 19, the recessed portion 78 connected to fuel gas passage grooves 75 (concave portions 75) is defined in a substantially triangular shape by a base 78a extending in a vertical direction, as an outer end of the passage turn adjacent portion, and a pair of hypotenuses 78b and 78c, as the boundaries with the fuel gas passage grooves 75 on both upstream and downstream sides. A plurality of protrusions 77 in an island form that vertically extend from the bottom face of the recessed portion 78 are disposed and arranged in an orthogonal grid shape so that their centers are in agreement with an extending direction (vertical direction) of the base 78a and with the direction (horizontal direction along the extended lines of the convex portions 76) perpendicular to this extending direction.

Such protrusions 77 are formed according to one shape selected from a substantially cylindrical shape, a substantially triangular prism shape, and a substantially quadrangular prism shape. In the present modified example, 14 pieces, in total, of first protrusions 77a formed in a substantially cylindrical or a substantially quadrangular prism shape, and 10 pieces, in total, of second protrusions 77b formed in a substantially cylindrical or a substantially quadrangular prism shape such as to have large widths along the vertical direction and the horizontal direction than the first protrusions 77a, are disposed alternately.

Specifically, as illustrated in FIG. 19, the first protrusions 77a and the second protrusions 77b that have different width dimensions along the vertical and horizontal directions from each other are disposed alternately in such a manner that the shapes of the protrusions 77 that are vertically and horizontally adjacent to each other become different from each other.

The details of the arrangement configurations of such protrusions 77 will be understood easily from the foregoing description and FIG. 19, and therefore the detailed descriptions thereof will be omitted here.

According to the arrangement configuration of the protrusions 77, the first protrusions 77a having a small width dimension along the vertical direction and the horizontal direction and the second protrusions 77b having a large width dimension along the vertical direction and the horizontal direction are disposed alternately in the horizontal direction and the vertical direction. Thereby, the lines connecting the centers 301 of the gaps between the first protrusions 77a and the second protrusions 77b in a vertical direction or a horizontal direction (one example of such a line is illustrated in FIG. 19 by the dotted line connecting the centers 301) curve in zigzag form in a longitudinal direction of the gaps (grid-shaped grooves) through which gas-liquid two-phase flow of the fuel gas and condensed water passes. As a result, when the gas-liquid two-phase flow passes through the gaps along the horizontal direction and the vertical direction in the recessed portion 78, the flow of the gas-liquid two-phase flow is disturbed and bent, and the gas-liquid two-phase flow is hindered from passing through the gaps easily.

Therefore, mixing of the fuel gas is further promoted by such a bent flow of the fuel gas. Moreover, the flooding due to the excessive condensed water in the fuel gas passage grooves 75 on the downstream side is further suppressed because of the bent flow of the condensed water.

Furthermore, by setting the numbers and locations of the first protrusions 77a and the second protrusions 77b appropriately for each of the columns and rows, the fuel gas passage resistance within the recessed portion 78 can be adjusted to make the fuel gas flow rate uniform.

MODIFIED EXAMPLE 2

Figure 20:
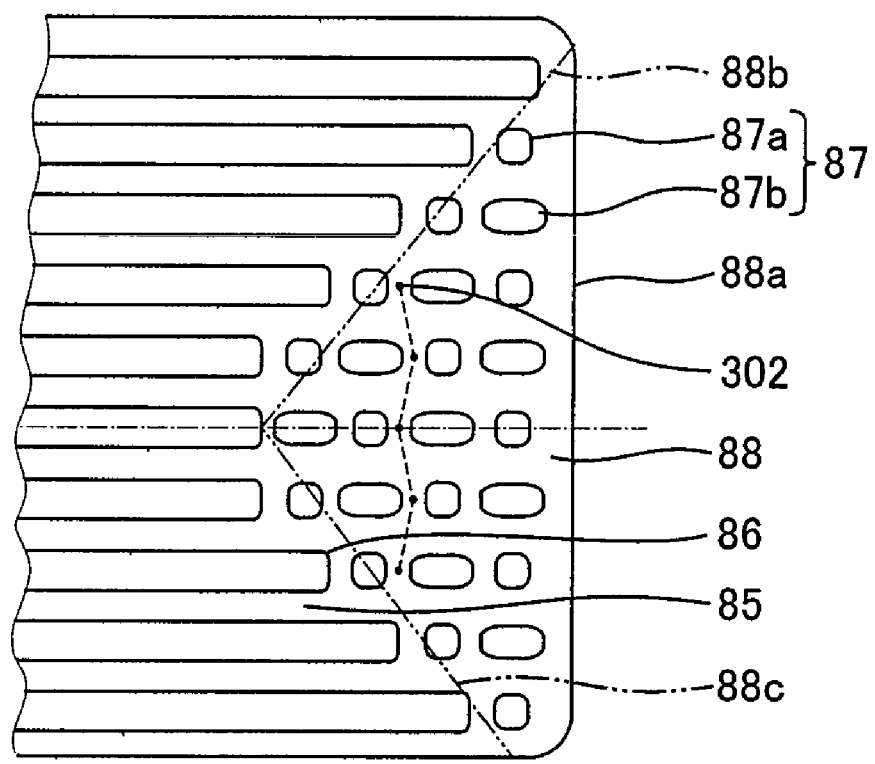
FIG. 20 is a view of the configuration of a passage turning adjacent portion, viewed in plan, according to modified example 2.

FIG. 20 is a view of the configuration of a passage turning adjacent portion, viewed in plan, according to modified example 2.

Referring to FIG. 20, the recessed portion 88 connected to fuel gas passage grooves 85 (concave portions 85) is defined in a substantially triangular shape by a base 88a extending in a vertical direction, as an outer end of the passage turn adjacent portion, and a pair of hypotenuses 88b and 88c, as the boundaries with the fuel gas passage grooves 85 on both upstream and downstream sides. A plurality of protrusions 87 in an island form that vertically extend from the bottom face of the recessed portion 88 are disposed and arranged in an orthogonal grid shape so that their centers are in agreement with an extending direction (vertical direction) of the base 88a and with the direction (horizontal direction along the extended lines of the convex portions 86) perpendicular to this extending direction.

Such protrusions 87 are formed according to one shape selected from a substantially cylindrical shape, a substantially triangular prism shape, and a substantially quadrangular prism shape. In the present modified example, 14 pieces, in total, of first protrusions 87a formed in a substantially cylindrical or a substantially quadrangular prism shape, and 10 pieces, in total, of second protrusions 87b formed in a substantially cylindrical shape (an elliptic cylinder shape herein) so as to have a larger width dimension along a horizontal direction than the first protrusions 87a, are disposed alternately.

Specifically, as illustrated in FIG. 20, the first protrusions 87a and the second protrusions 87b that have different width dimensions along the horizontal direction from each other are disposed alternately in such a manner that the shapes of the protrusions 87 that are vertically and horizontally adjacent to each other become different from each other.

The details of the arrangement configurations of the protrusions 87 will be understood easily from the foregoing description and FIG. 20, and therefore the detailed descriptions thereof will be omitted here.

According to the arrangement configuration of the protrusions 87, the first protrusions 87a having a small width dimension along the horizontal direction and the second protrusions 87b having a large width dimension (length of the longitudinal axis) along the horizontal direction are disposed alternately in the horizontal direction and the vertical direction. Thereby, the lines connecting the centers 302 of the gaps between the first protrusions 87a and the second protrusions 87b in a vertical direction (one example of such a line is illustrated in FIG. 20 by the dotted line connecting the centers 302) curve in zigzag form in a longitudinal direction of the gaps (grid-shaped grooves) through which gas-liquid two-phase flow of the fuel gas and condensed water passes. As a result, when the gas-liquid two-phase flow passes through the gaps along the horizontal direction and the vertical direction in the recessed portion 88, the flow of the gas-liquid two-phase flow is disturbed and bent, and the gas-liquid two-phase flow is hindered from passing through the gaps easily.

Therefore, mixing of the fuel gas is further promoted by such a bent flow of the fuel gas. Moreover, the flooding due to the excessive condensed water in the fuel gas passage grooves 85 on the downstream side is further suppressed because of the bent flow of the condensed water.

Furthermore, by setting the numbers and locations of the first protrusions 87a and the second protrusions 87b appropriately for each of the columns, the fuel gas passage resistance within the recessed portion 88 can be adjusted to make the fuel gas flow rate uniform.

MODIFIED EXAMPLE 3

Figure 21:
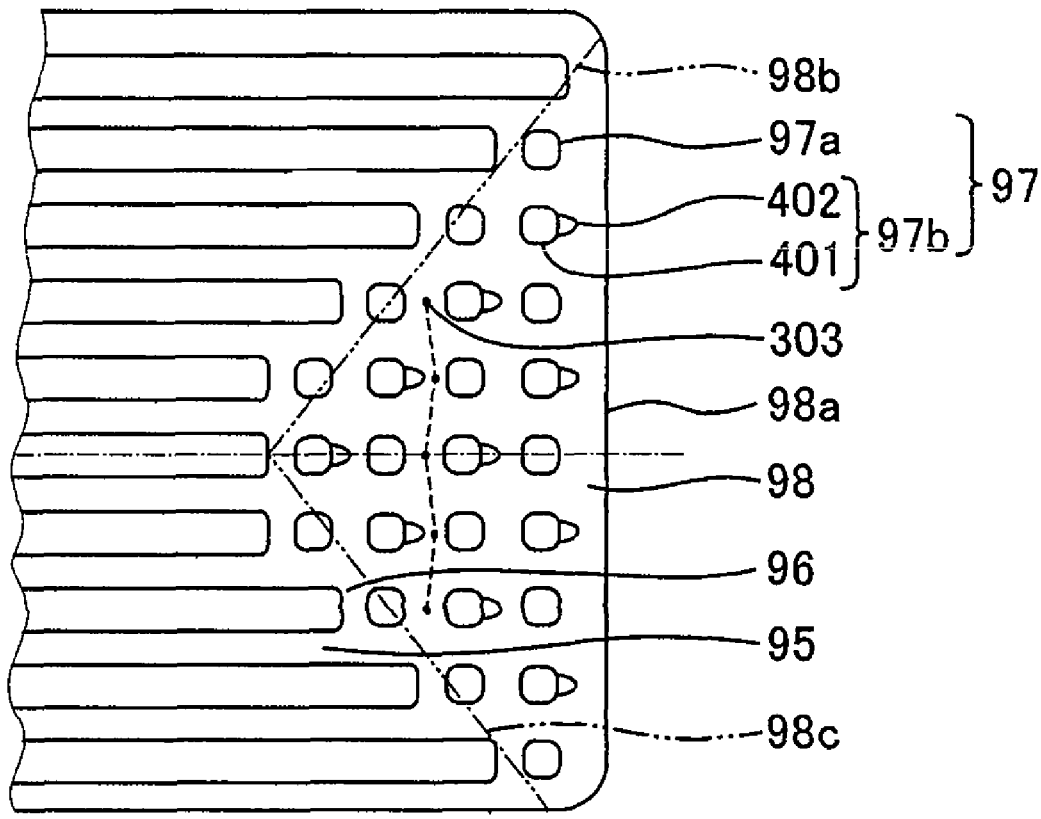
FIG. 21 is a view of the configuration of a passage turning adjacent portion, viewed in plan, according to modified example 3.

FIG. 21 is a view of the configuration of a passage turning adjacent portion, viewed in plan, according to modified example 3.

Referring to FIG. 21, the recessed portion 98 connected to fuel gas passage grooves 95 (concave portions 95) is defined in a substantially triangular shape by a base 98a extending in a vertical direction, as an outer end of the passage turn adjacent portion, and a pair of hypotenuses 98b and 98c, as the boundaries with the fuel gas passage grooves 95 on both upstream and downstream sides. A plurality of protrusions 97 in an island form that vertically extend from the bottom face of the recessed portion 98 are disposed and arranged in an orthogonal grid shape so that their centers are in agreement with an extending direction (vertical direction) of the base 98a and with the direction (horizontal direction along the extended lines of the convex portions 96) perpendicular to this extending direction.

Such protrusions 97 are formed in one shape selected from a substantially cylindrical shape, a substantially triangular prism shape, and a substantially quadrangular prism shape. In the present modified example, 14 pieces, in total, of first protrusions 97a formed in a substantially cylindrical or a substantially quadrangular prism shape and 10 pieces, in total, of second protrusions 97b, each of which has a base portion 401 having the same shape as the first protrusion 97a and a projecting portion 402 protruding from a portion of a side face of the base portion 401 in the right direction (the direction toward the base 98a) and has a large width dimension along the horizontal direction so as to be formed asymmetrically with respect to the horizontal direction, are disposed alternately.

Specifically, as illustrated in FIG. 21, the first protrusions 97a and the second protrusions 97b that have different width dimensions along the horizontal direction from each other are disposed alternately in such a manner that the shapes of the protrusions 97 that are vertically and horizontally adjacent to each other become different from each other.

The details of the arrangement configurations of the protrusions 97 will be understood easily from the foregoing description and FIG. 21, and therefore the detailed descriptions thereof will be omitted here.

According to the arrangement configuration of the protrusions 97, the first protrusions 97a having a small width dimension along the horizontal direction and the second protrusions 97b having a large width dimension along the horizontal direction are disposed alternately in the horizontal direction and the vertical direction. Thereby, the lines connecting the centers 303 of the gaps between the first protrusions 97a and the second protrusions 97b in a vertical direction (one example of such a line is illustrated in FIG. 21 by the dotted line connecting the centers 303) curve in zigzag form in a longitudinal direction of the gaps (grid-shaped grooves) through which gas-liquid two-phase flow of the fuel gas and condensed water passes. As a result, when the gas-liquid two-phase flow passes through the gaps along the vertical direction in the recessed portion 98, the flow of the gas-liquid two-phase flow is disturbed and bent, and the gas-liquid two-phase flow is hindered from passing through the gaps easily.

Therefore, mixing of the fuel gas is further promoted by such a bent flow of the fuel gas. Moreover, the flooding due to the excessive condensed water in the fuel gas passage grooves 95 on the downstream side is further suppressed because of the bent flow of the condensed water.

Furthermore, by setting the numbers and locations of the first protrusions 97a and the second protrusions 97b appropriately for each of the columns, the fuel gas passage resistance within the recessed portion 98 can be adjusted to make the fuel gas flow rate uniform.

MODIFIED EXAMPLE 4

Figure 22:
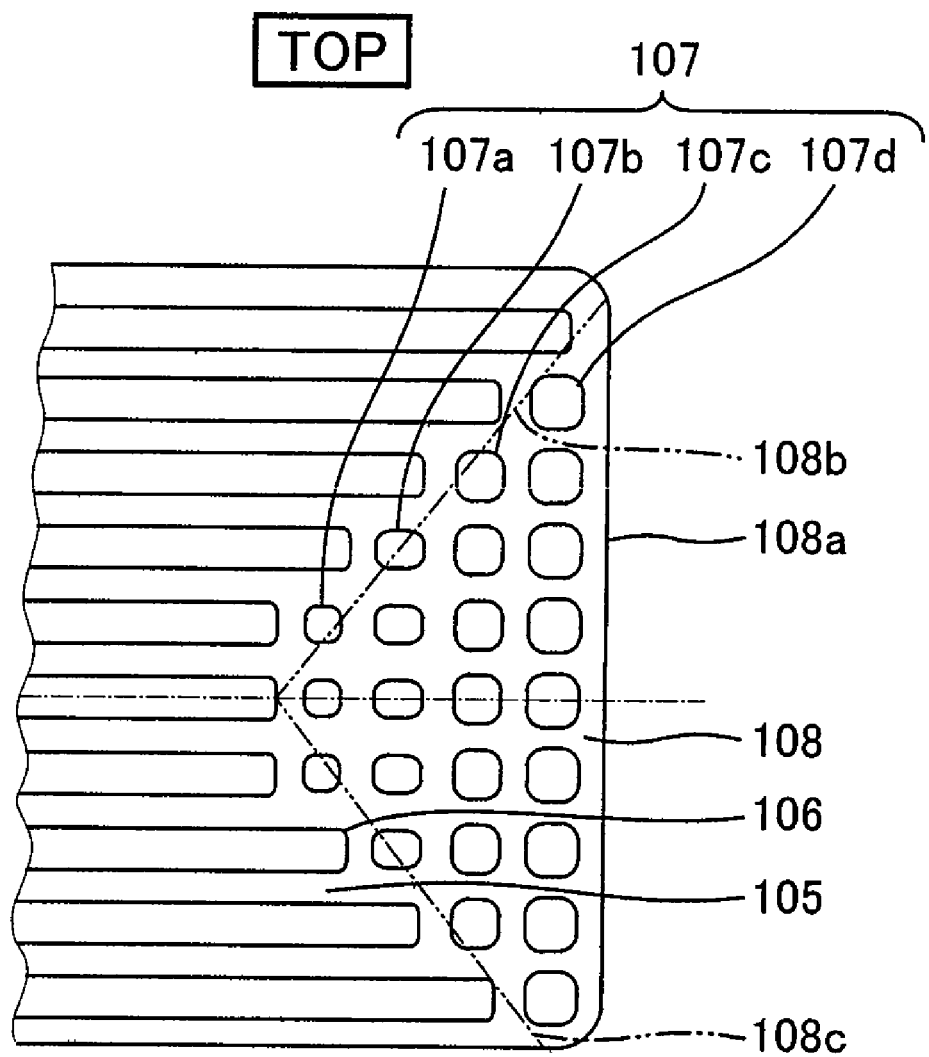
FIG. 22 is a view of the configuration of a passage turning adjacent portion, viewed in plan, according to modified example 4.

FIG. 22 is a view of the configuration of a passage turning adjacent portion, viewed in plan, according to modified example 4.

Referring to FIG. 22, the recessed portion 108 connected to fuel gas passage grooves 105 (concave portions 105) is defined in a substantially triangular shape by a base 108a extending in a vertical direction, as an outer end of the passage turn adjacent portion, and a pair of hypotenuses 108b and 108c, as the boundaries with the fuel gas passage grooves 105 on both upstream and downstream sides. A plurality of protrusions 107 in an island form that vertically extend from the bottom face of the recessed portion 108 are disposed and arranged in an orthogonal grid shape so that their centers are in agreement with an extending direction (vertical direction) of the base 108a and with the direction (horizontal direction along the extended lines of the convex portions 106) perpendicular to this extending direction.

Such protrusions 107 are formed in one shape selected from a substantially cylindrical shape, a substantially triangular prism shape, and a substantially quadrangular prism shape. In the present modified example, the protrusions 107 include: 3 pieces of first protrusions 107a that are formed in a substantially cylindrical or a substantially quadrangular prism shape, which constitute the first row; 5 pieces of second protrusions 107b that are formed in a substantially cylindrical or a substantially quadrangular prism shape such as to have larger width dimensions along a vertical direction and a horizontal direction than the first protrusions 107a, which constitute the second row; 7 pieces of third protrusions 107c that are formed in a substantially cylindrical or a substantially quadrangular prism shape such as to have larger width dimensions along a vertical direction and a horizontal direction than the second protrusions 107b, which constitute the third row;

and 9 pieces of fourth protrusions 107*d* that are formed in a substantially cylindrical or a substantially quadrangular prism shape such as to have larger width dimensions along a vertical direction and a horizontal direction than the third protrusions 107*c*, which constitute the fourth row.

As illustrated in FIG. 22, the first protrusions 107*a*, second protrusions 107*b*, the third protrusions 107*c*, and the fourth protrusions 107*d*, which have different width dimensions vertically and horizontally, are disposed and selected as appropriate so that the shapes of the protrusions 107 are greater on the right (the convex portion 106 side) than those on the left (the base 108*a* side) in the second row through the eighth row.

For example, in a horizontal direction of the fourth row, a first protrusion 107*a* adjacent to a convex portion 106, a second protrusion 107*b* adjacent to the first protrusion 107*a*, a third protrusion 107*c* adjacent to the second protrusion 107*b*, and a fourth protrusion 107*d* adjacent to the third protrusion 107*c* and the base 108*a* are disposed to be lined up in that order.

The details of the arrangement configurations of the protrusions 107 except for those in the fourth row will be understood easily from the foregoing description and FIG. 22, and therefore the detailed descriptions thereof will be omitted here.

According to the arrangement configuration of such protrusions 107, the protrusions 107 having greater width dimensions on the right than those on the left along the vertical direction and the horizontal direction are disposed. Thereby, it is possible to change the distance between the protrusions 107, the distance between the protrusions 107 and the base 108*a*, and the distance between the protrusions 107 and the convex portions 106 appropriately according to the flow rate of the fuel gas.

Therefore, the flow rate distribution of the gas-liquid two-phase flow passing through the recessed portions 108 can be made uniform over the entire surface of appropriately by adjusting the fuel gas passage resistance exhibited by changing the distances.

MODIFIED EXAMPLE 5

Figure 23:
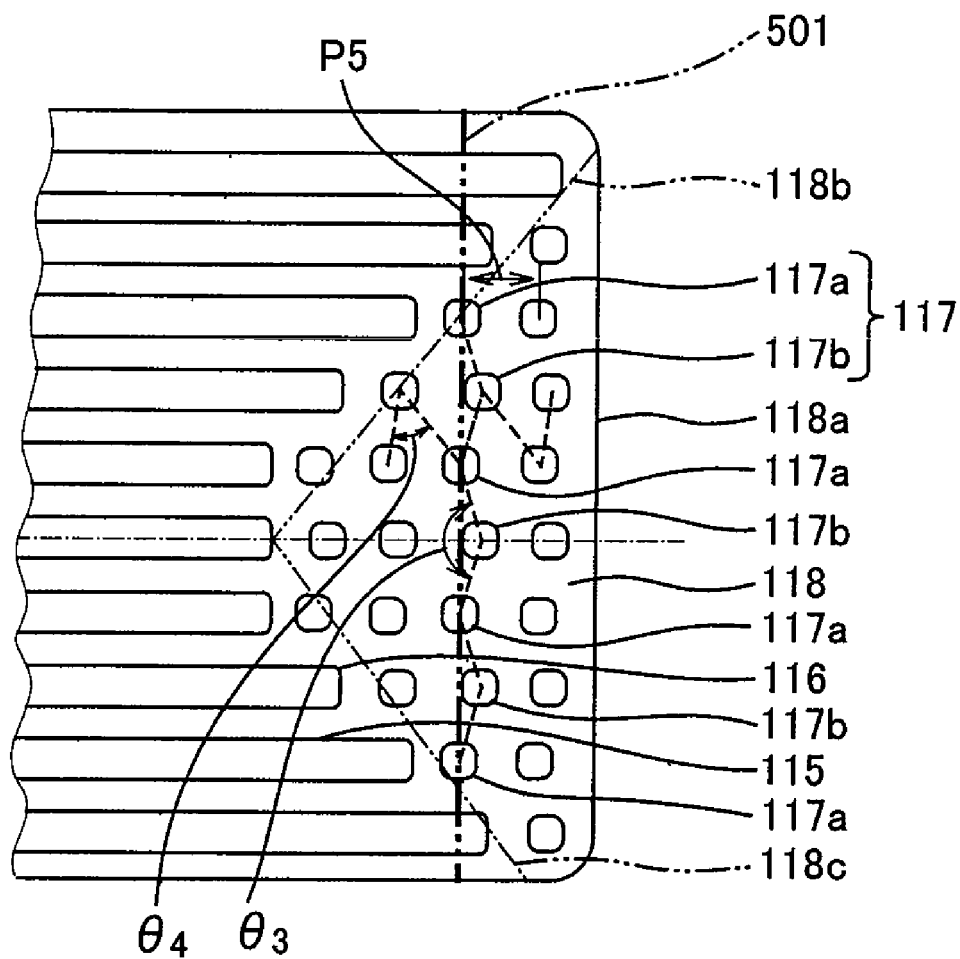
FIG. 23 is a view of the configuration of a passage turning adjacent portion, viewed in plan, according to modified example 5.

FIG. 23 is a view of the configuration of a passage turning adjacent portion, viewed in plan, according to modified example 5.

Referring to FIG. 23, a recessed portion 118 connected to fuel gas passage grooves 115 (concave portions 115) is defined in a substantially triangular shape by a base 118*a* extending linearly in a vertical direction, as an outer end of the passage turn adjacent portion, and a pair of hypotenuses 118*b* and 118*c*, as the boundaries with the fuel gas passage grooves 115 on both upstream and downstream sides.

A plurality of protrusions 117 in a substantially cylinder shape or a quadrangular prism shape that vertically extend from the bottom face of the recessed portion 118 is so formed to be lined up at a uniform pitch along an extending direction (i.e., vertical direction) of the base 118*a* and be lined up at a uniform pitch along a direction perpendicular to the extending direction of the base 118*a* (i.e., horizontal direction). Hereinbelow, a continuum of the protrusions 117 along a vertical direction (including the case of only one protrusion) is referred to as a "column," and the continuum of the protrusions 117 along a horizontal direction is referred to as a "row" (including the case of only one protrusion). Accordingly, the plurality of the protrusions 117 are formed to have 8 columns (respectively referred to as the first column through the eighth column in that order from the vertex of the recessed portion 118) and 9 rows (respectively referred to as the first row through the ninth row in that order from the top). Each column comprises the protrusions 117 that constitute every other row. Conversely, each row comprises the protrusions 117 that constitute every other column.

Thus, the lines connecting the centers of the protrusions 117 in the adjacent columns with each other, or the lines connecting the centers of the protrusions 117 in the adjacent rows with each other, extend in such a manner as to bend in a V-shape in a vertical direction along the base 118*a* and in a horizontal direction on an extended line of the convex portions 46 and to be arrayed regularly in what is called zigzag form. For example, the lines connecting the centers of the protrusions 117 in adjacent columns with each other in a vertical direction (see the dotted lines in FIG. 23) extend in zigzag form so that they are bent at an obtuse angle ($\theta_3$ shown in FIG. 23 being about 152 degrees) over a plurality of times, while the lines connecting the centers of the protrusions 117 in adjacent rows with each other in a horizontal direction (see the dotted lines in FIG. 23) extend in zigzag form so that they are bent at an acute angle ($\theta_4$ shown in FIG. 23 being about 51 degrees) over a plurality of times.

When a virtual line 501 passing through the centers of protrusions 117*a* that constitute one row and being parallel to the vertical direction (one example of such a virtual line is illustrated by bold two-dot chain lines in FIG. 23) is drawn, the centers of protrusions 117*b* that are vertically adjacent to the protrusions 117*a*, which constitute the one row, deviate from the virtual line 501 in a horizontal direction.

For example, as shown in FIG. 23, the fifth column, which is along the virtual line 501 and is formed by the protrusions 117*a* in even-numbered rows, such as the four protrusion 117*a* in the second row, the fourth row, the sixth row, and the eighth row, and the sixth column, which is adjacent to the virtual line 501 and is formed by the protrusions 117*b* in odd-numbered rows, such as the three protrusions 117*b* in the third row, the fifth row, and the seventh row, deviate from each other by about ¼ pitch of the pitch P5 between the protrusions 117 in the same rows. In other words, the protrusions 117*a* and the protrusions 117*b* are disposed alternately being spaced apart from each other at about ¼ pitch horizontally and spaced apart by a width of the concave portion 115 vertically. When the amount of the just-described deviation reaches half the pitch P2 of the protrusions 117, the protrusion array pattern according to the present modified example becomes the same kind of pattern as the arrangement shown in FIG. 10.

The arrangement configurations of the protrusions 97 except for those in the fifth column and the sixth column will be understood easily from the foregoing description and FIG. 23, and therefore the descriptions thereof will be omitted here.

When the gas-liquid two-phase flow travels from above downward in the recessed portion 118, the protrusions 117 made to deviate in this manner make it possible to hinder the gas-liquid two-phase flow from easily passing through the gaps between the protrusions 117 and to cause the gas-liquid two-phase flow to hit the protrusions 117 appropriately a plurality of times to disturb the flow, and that thereby they can suppress the flooding due to the excessive condensed water in the fuel gas passage grooves 115 downstream from the recessed portion 118.

When a virtual line passing through the centers protrusions constituting one column and being parallel to a horizontal direction is drawn, it is conceivable to form a zigzag array pattern of protrusions in which the centers of the protrusions that are horizontally adjacent to the protrusions constituting the one column deviate from the virtual line in a vertical direction, although not shown in the drawings herein. In this case, when the gas-liquid two-phase flow travels leftward or rightward in the recessed portion, it is possible to hinder the gas-liquid two-phase flow from easily passing through the gaps between the protrusions and to cause the gas-liquid two-phase flow to hit the protrusions appropriately a plurality of times to disturb the flow, and that thereby they can suppress the flooding due to the excessive condensed water in the fuel gas passage grooves downstream from the recessed portion.

From the foregoing description, numerous improvements and other embodiments of the present invention will be readily apparent to those skilled in the art. Accordingly, the foregoing description is to be construed only as illustrative examples and as being presented for the purpose of suggesting the best mode for carrying out the invention to those skilled in the art. Various changes and modifications can be made substantially in the details of the structures and/or functions without departing from the scope and spirit of the invention.

INDUSTRIAL APPLICABILITY

The fuel cell separator according to the present invention can improve uniformity in reaction gas flow rate and suppress the flooding due to excessive condensed water. This separator may be applicable to, for example, polymer electrolyte fuel cells.

The invention claimed is:

1. A fuel cell separator, wherein:
said fuel cell separator is formed in a plate shape and is provided on at least one main surface thereof with a reaction gas passage region through which a reaction gas flows, the reaction gas passage region being formed in a serpentine shape having a plurality of linear portions and one or more turn portions provided between the plurality of linear portions,
said reaction gas passage region comprises:
a plurality of flow splitting regions being formed so as to include at least said linear portions of said plurality of linear portions and said one or more turn portions, and having a passage groove group for splitting the reaction gas; and
one or more flow merge regions formed in at least one of said one or more turn portions, said one or more flow merge regions having a recessed portion serving as a space in which the reaction gas is mixed and a plurality of protrusions that vertically extend from a bottom face of said recessed portion and are arranged in an island form, being disposed between the passage groove group of an adjacent upstream flow splitting region and the passage groove group of an adjacent downstream flow splitting region of said plurality of flow splitting regions, and being configured to allow the reaction gas flowing therein from said passage groove group of said upstream flow splitting region to merge in said recessed portion and to allow the reaction gas that has been merged to split again and flow into said downstream flow splitting region,
in said upstream flow splitting region and said downstream flow splitting region that are connected to said recessed portion of said merge region, the number of grooves of said passage groove group of said upstream flow splitting region is greater than the number of grooves of said passage groove group of said downstream flow splitting region,
said recessed portion of said flow merge region is, in said turn portion of said reaction gas passage region in which said recessed portion is formed, defined by an outer end of said turn portion and oblique boundaries between said recessed portion and a pair of said upstream passage groove group and said downstream passage groove group which are connected to said recessed portion, and
said outer end curves in a position thereof to form an outer end protruding portion protruding toward said recessed portion.

2. The fuel cell separator according to claim 1, wherein:
a convex-concave pattern comprising a plurality of concave portions having a uniform width, a uniform pitch, and a uniform level difference and a plurality of convex portions having a uniform width, a uniform pitch, and a uniform level difference in a direction crossing said passage groove group, when viewed from a direction substantially normal to the main surface, is formed on a surface of said separator corresponding to said flow splitting region; and
said concave portions are passage grooves of said passage groove group, said convex portions are ribs for supporting an electrode portion making in contact with the main surface, and said protrusions are disposed on an extended line of said ribs.

3. The fuel cell separator according to claim 1, wherein, when each of said protrusions is formed in a substantially cylindrical shape, a first distance between said protrusions and said ribs, between said protrusions and said outer end protruding portions, and between said ribs and said outer end is set smaller than a second distance between said protrusions.

4. The fuel cell separator according to claim 3, wherein the first distance and the second distance are set in such a manner that the product of the first distance and the flow rate of the reaction gas passing across the first distance when the first distance and the second distance are assumed to be constant substantially matches the product of the second distance and the flow rate of the reaction gas passing across the second distance when the first distance and the second distance are assumed to be constant.

5. The fuel cell separator according to claim 1, wherein said plurality of protrusions are disposed so that one or more of said protrusions form a plurality of columns lined up and spaced apart from each other with a gap along an extending direction of the outer end and one or more of said protrusions form a plurality of rows lined up and spaced apart from each other with a gap along a direction perpendicular to the extending direction of the outer end, and each of said columns is constituted by said protrusions constituting every other said row.

* * * * *